(12) United States Patent
Moertl et al.

(10) Patent No.: US 7,590,817 B2
(45) Date of Patent: Sep. 15, 2009

(54) COMMUNICATING WITH AN I/O DEVICE USING A QUEUE DATA STRUCTURE AND PRE-TRANSLATED ADDRESSES

(75) Inventors: Daniel F. Moertl, Rochester, MN (US); Renato J. Recio, Austin, TX (US); Claudia A. Salzberg, Austin, TX (US); Steven M. Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 11/550,162

(22) Filed: Oct. 17, 2006

(65) Prior Publication Data

US 2008/0148005 A1 Jun. 19, 2008

(51) Int. Cl.
*G06F 12/02* (2006.01)
(52) U.S. Cl. .................. 711/202; 711/206
(58) Field of Classification Search ............ None
See application file for complete search history.

(56) References Cited

U.S. PATENT DOCUMENTS

| | | |
|---|---|---|
| 6,629,162 B1 | 9/2003 | Arndt et al. |
| 7,155,541 B2 | 12/2006 | Ganapathy et al. |
| 7,334,107 B2 | 2/2008 | Schoinas et al. |
| 7,353,360 B1 | 4/2008 | Muller et al. |
| 2006/0075147 A1 | 4/2006 | Schoinas et al. |
| 2006/0133697 A1 | 6/2006 | Uvarov et al. |
| 2006/0136697 A1* | 6/2006 | Tsao et al. ............ 711/206 |
| 2006/0195675 A1 | 8/2006 | Arndt et al. |
| 2007/0038839 A1 | 2/2007 | Hummel et al. |
| 2008/0065854 A1 | 3/2008 | Schoenberg et al. |
| 2008/0080491 A1 | 4/2008 | Saripalli |

OTHER PUBLICATIONS

U.S. Appl. No. 11/550,115, filed Oct. 17, 2006, Moertl et al.
U.S. Appl. No. 11/550,191, filed Oct. 17, 2006, Moertl et al.
U.S. Appl. No. 11/550,193, filed Oct. 17, 2006, Moertl et al.
U.S. Appl. No. 11/550,217, filed Oct. 17, 2006, Moertl et al.
InfiniBand™ Host Channel Adapter Verb Implementer's Guide, Revision 1.3, Intel Corporation, Mar. 23, 2003, 67 pages.
"Address Translation Services", PCI-SIG, Mar. 2006, pp. 1-35.
Abramson, Darren et al., "Intel Virtualization Technology for Directed I/O", Intel Technology Journal, vol. 10, Issue 3, 2006, pp. 179-192.
Krause, Michael et al., "I/O Virtualization and Sharing", PCI-SIG, 2006, pp. 1-56.

* cited by examiner

*Primary Examiner*—Than Nguyen
(74) *Attorney, Agent, or Firm*—Stephen J. Walder, Jr.; Libby Z. Handelsman

(57) ABSTRACT

Mechanisms for communicating with an I/O device or endpoint using a queue data structure and pre-translated addresses associated with the queue data structure are provided. With the mechanisms, a device driver invokes device driver services for initializing address translation and protection table (ATPT) entries in a root complex for the queue data structure. The device driver services return untranslated addresses to the device driver which are in turn provided to the I/O device or endpoint. The I/O device or endpoint may then request a translation of these untranslated addresses and store them in the I/O device or endpoint prior to receiving an I/O operation targeting the queue data structure. The cached translation may be used to directly access the queue data structure from the I/O device or endpoint by bypassing the root complex's address translation facilities.

19 Claims, 16 Drawing Sheets

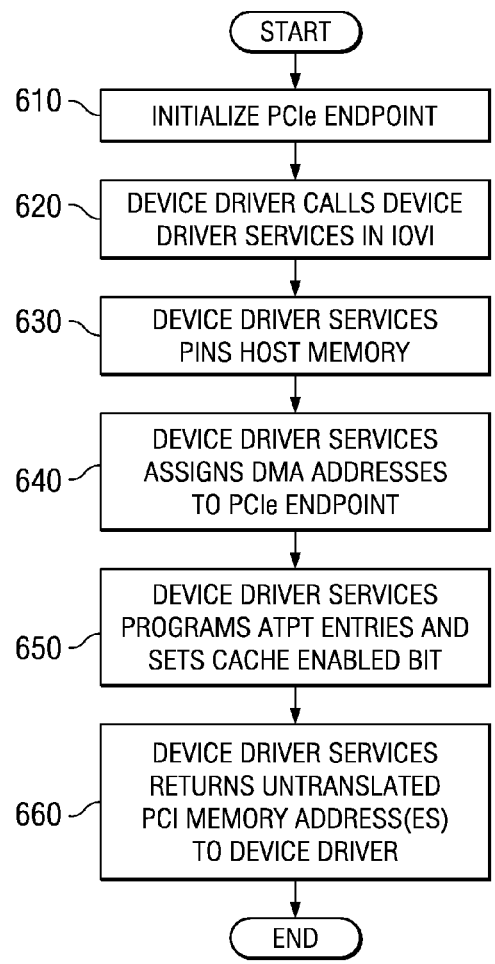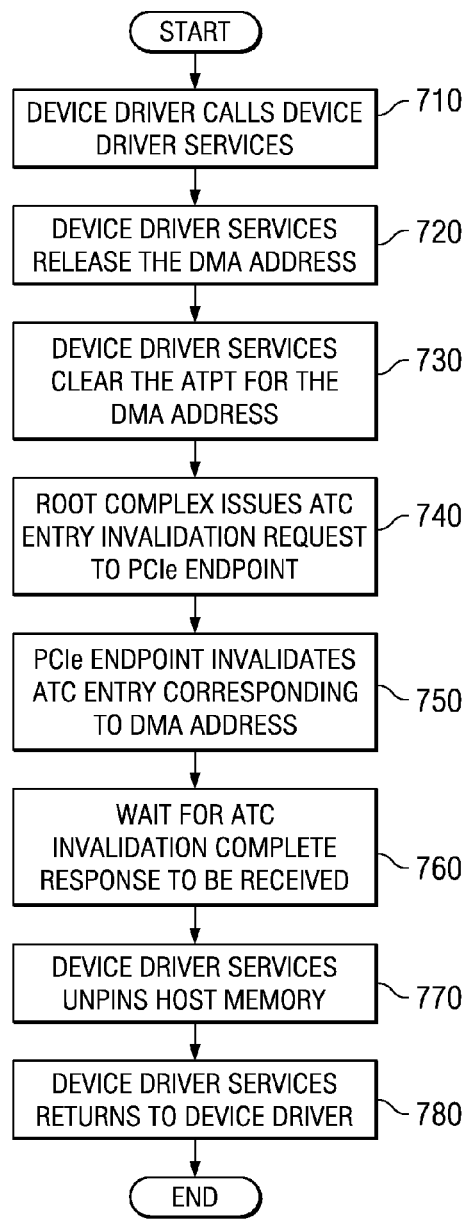

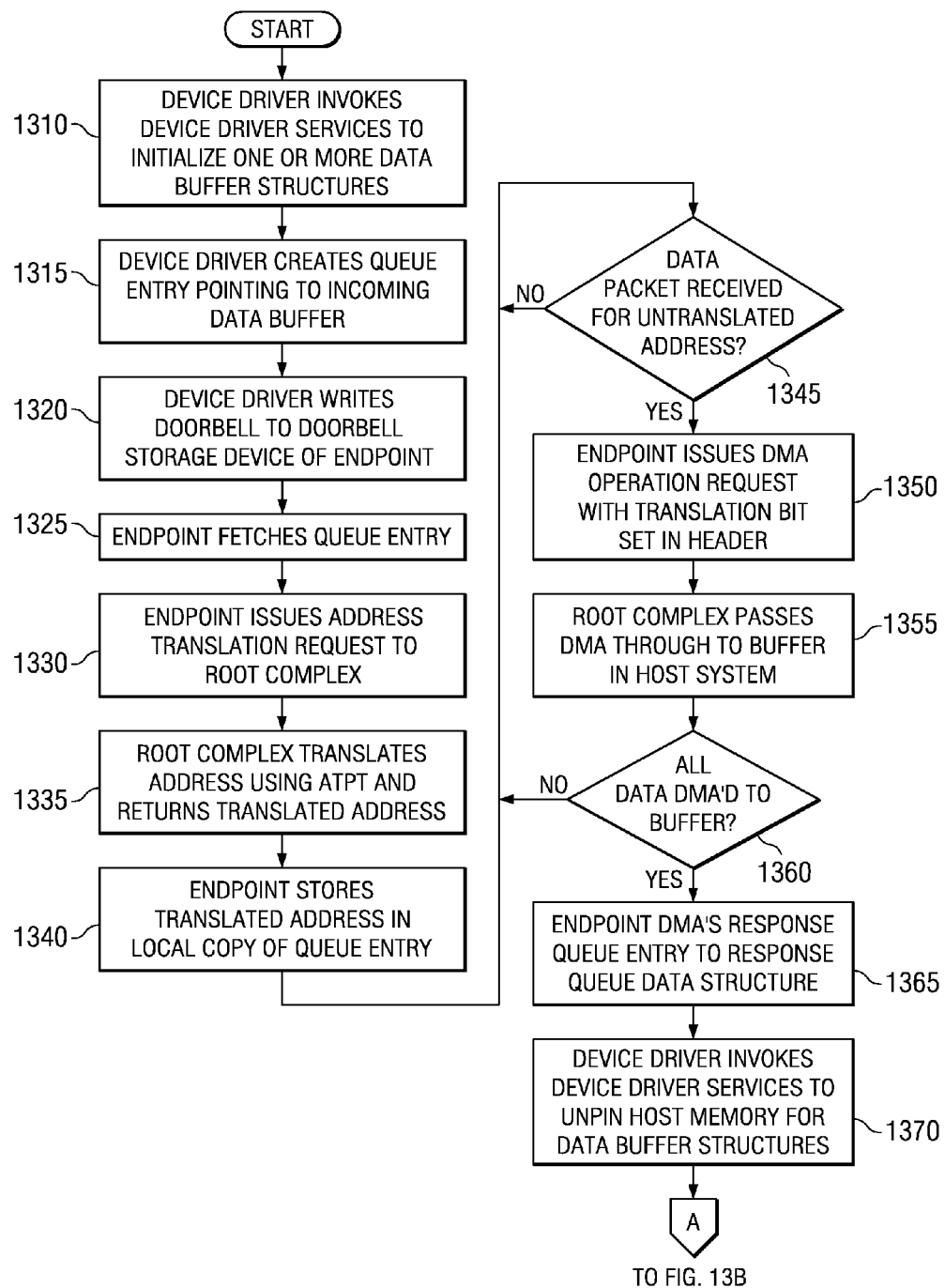

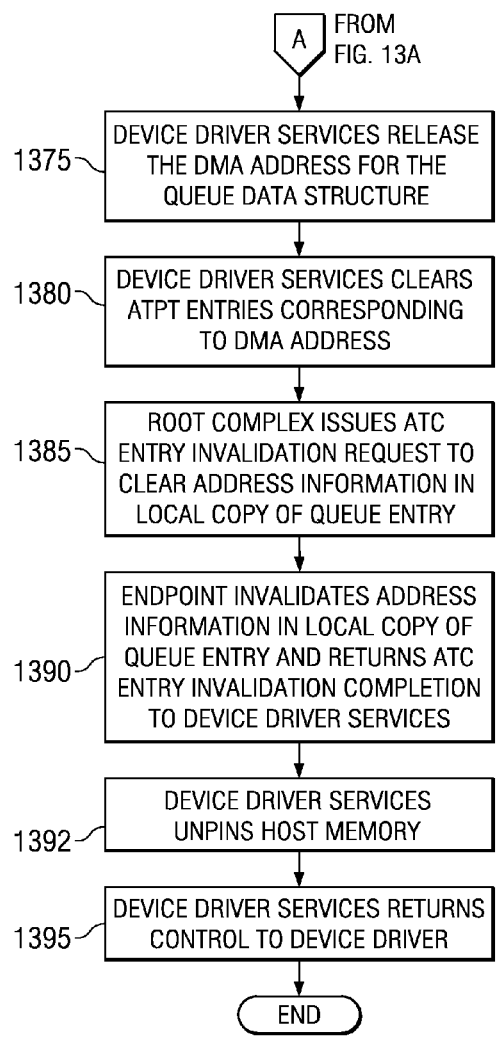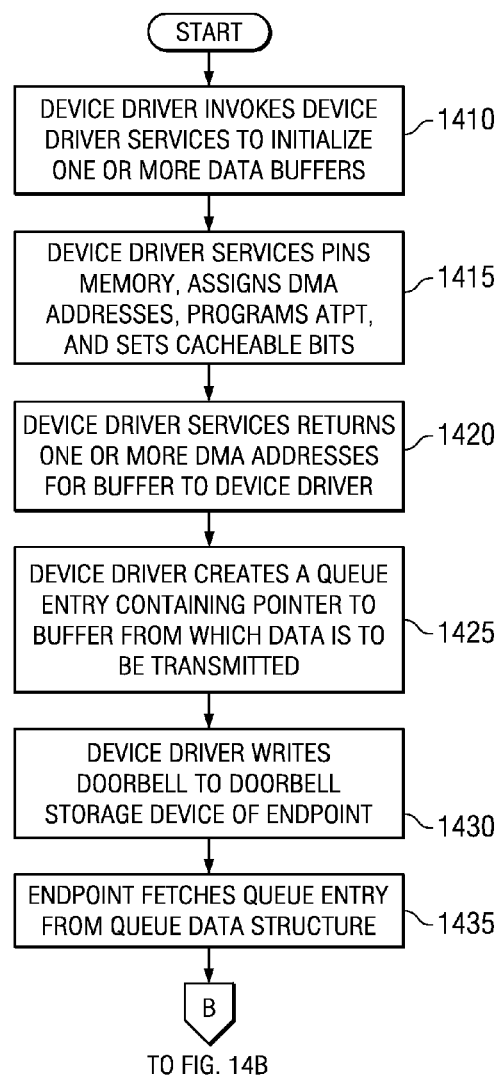

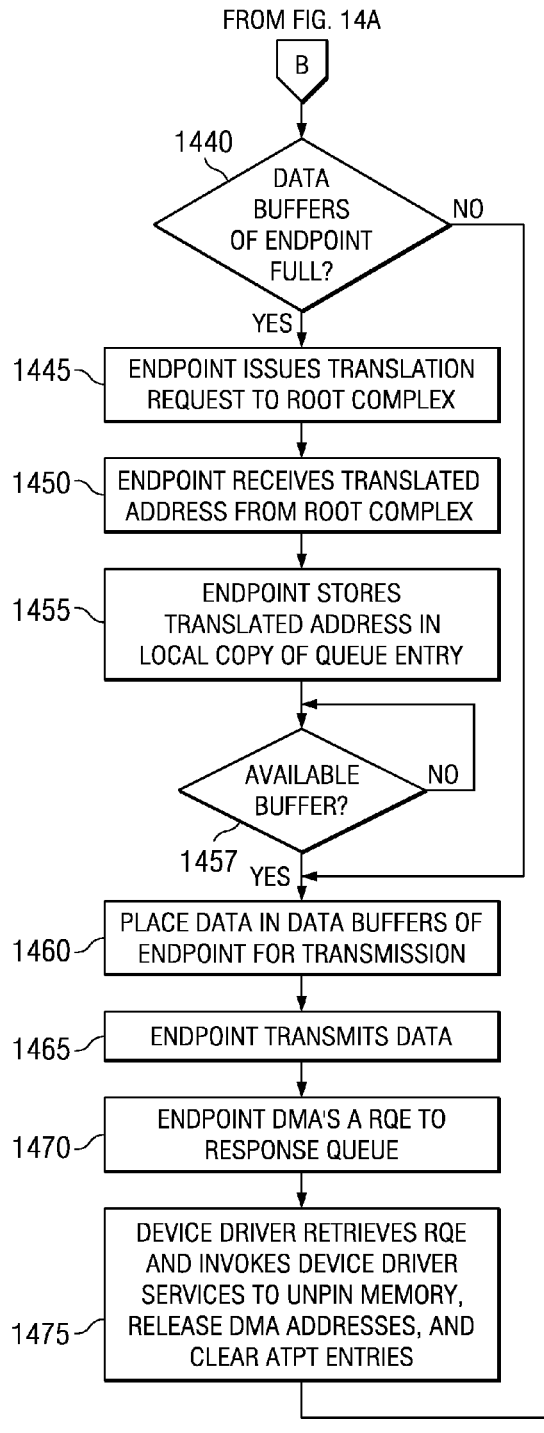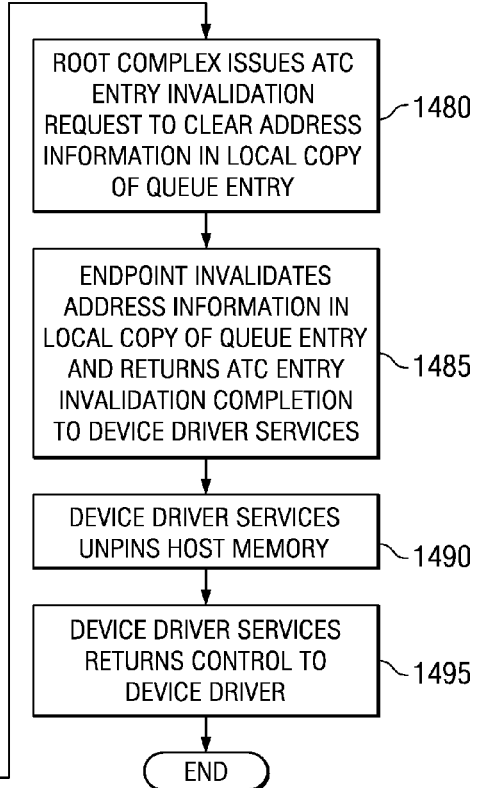
FIG. 14B

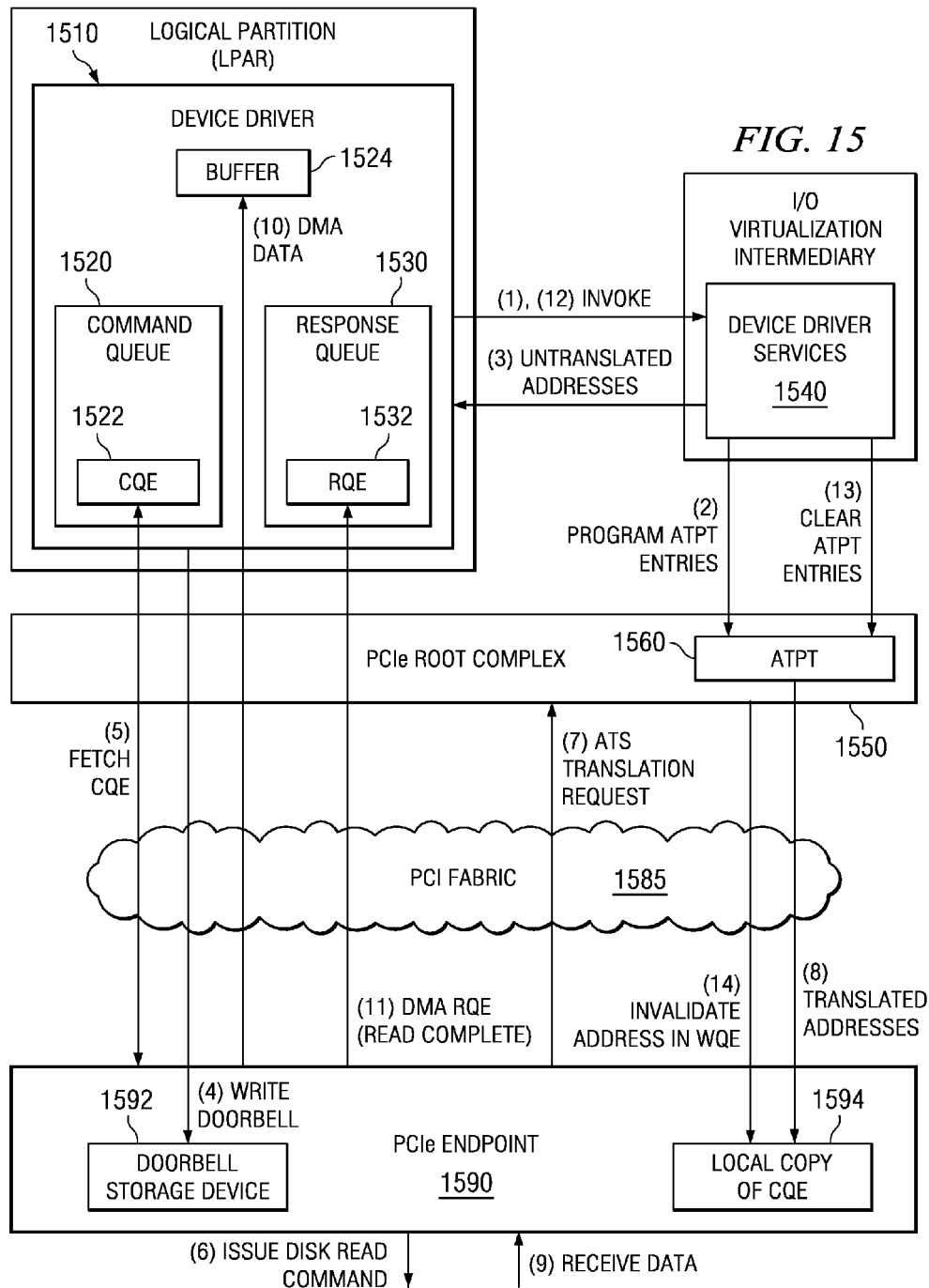

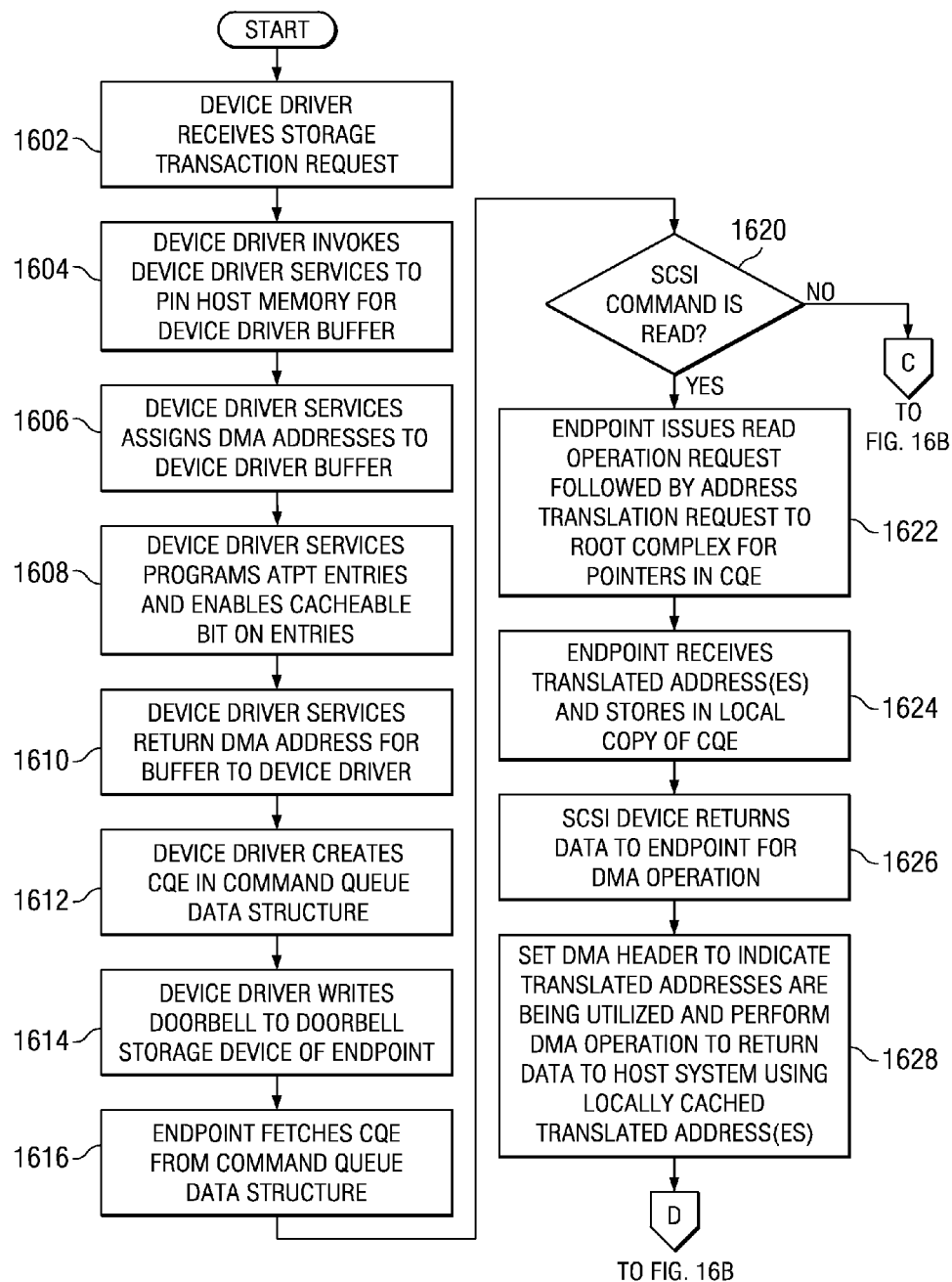

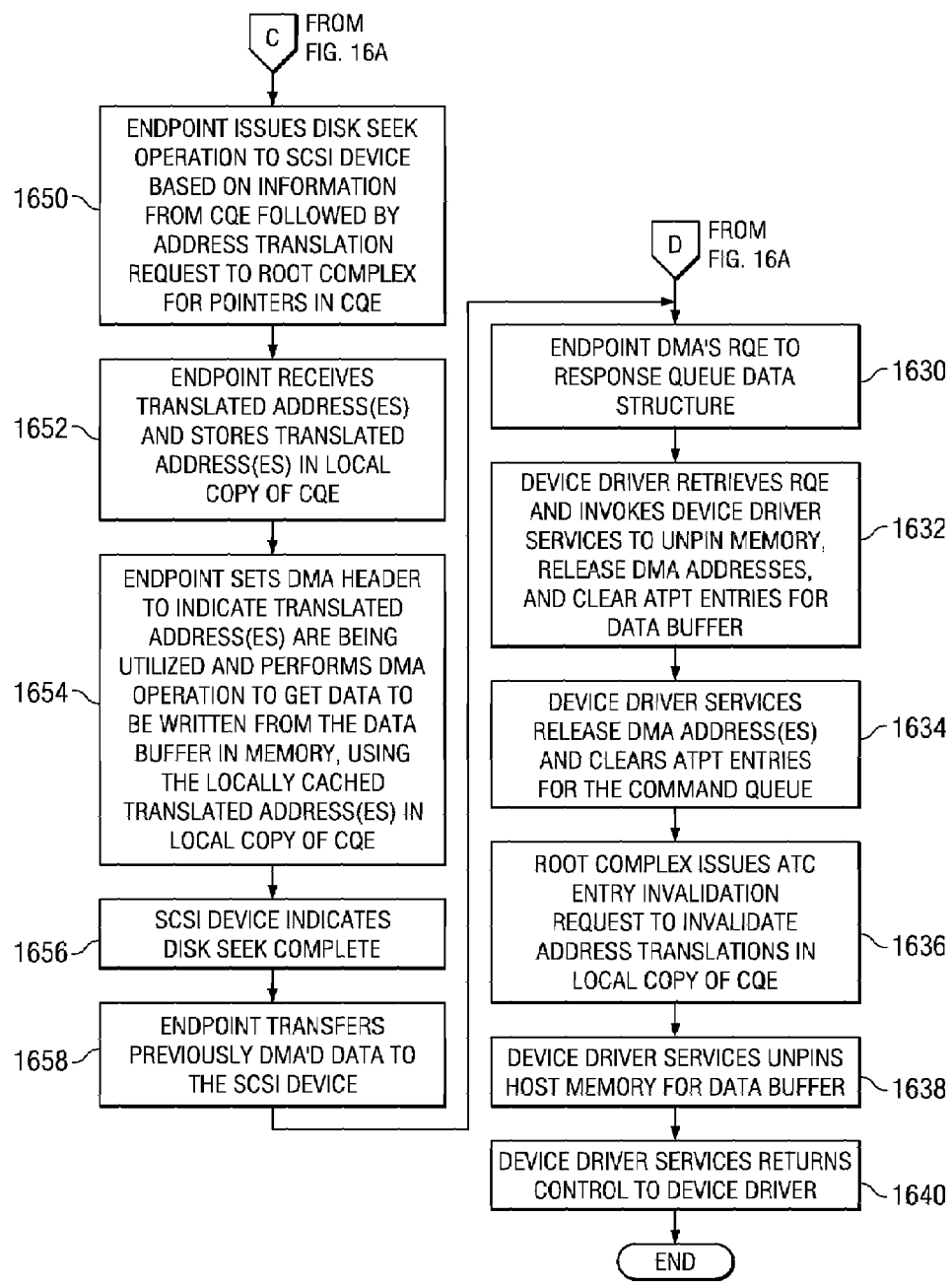

COMMUNICATING WITH AN I/O DEVICE USING A QUEUE DATA STRUCTURE AND PRE-TRANSLATED ADDRESSES

BACKGROUND

1. Technical Field

The present application relates generally to an improved data processing system and method. More specifically, the present application is directed to an apparatus and method for communicating with an I/O device or endpoint using a queue data structure and pre-translated addresses, which may be cached in the I/O device or endpoint.

2. Description of Related Art

On some systems, with current Peripheral Component Interconnect (PCI) protocols, when performing direct memory access (DMA) operations, address translation and access checks are performed using an address translation and protection table (ATPT). Though ATPTs have been in use for several decades, they are new to lower end systems and are known by several other names, such as a Direct Memory Access (DMA) Remapping Resource or an Input/Output Memory Management Unit (IOMMU). The ATPT stores entries for translating PCI bus addresses, utilized in DMA transactions, to real memory addresses used to access the real memory resources. The entries in the ATPT store protection information identifying which devices may access corresponding portions of memory and the particular operations that such devices may perform on these portions of memory.

Recently, the PCI-SIG has been in the process of standardizing mechanisms that allow the address translations resident in an ATPT to be cached in a PCI family adapter. These mechanisms are known as Address Translation Services (ATS). ATS allows a PCI family adapter to request a translation for an untranslated PCI Bus address, where a successful completion of such a request on a system that supports ATS returns the translated, i.e. real memory address, to the PCI family adapter. ATS allows a PCI family adapter to then mark PCI bus addresses used in DMA operations as translated. A system that supports ATS will then use the translated addresses to bypass the ATPT. ATS also provides a mechanism by which the host side (e.g. hardware or virtualization intermediary) can invalidate a previously advertised address translation.

FIG. 1 is an exemplary diagram illustrating a conventional mechanism for performing DMA operations using an ATPT and the PCI express (PCIe) communication protocol. The depicted example also shows the PCIe address translation service (ATS) described above, which is invoked by PCIe endpoints, e.g., PCIe input/output (I/O) adapters that use ATS to perform address translation operations. ATS functionality is built into the PCIe endpoints and the root complex of the host system, as discussed hereafter. For more information regarding PCIe ATS, reference is made to the PCIe ATS specification available from the peripheral component interconnect special interest group (PCI-SIG) website.

As shown in FIG. 1, the host CPUs and memory 110 are coupled by way of a system bus 115 to a PCIe root complex 120 that contains the address translation and protection tables (ATPT) 130. The PCIe root complex 120 is in turn coupled to one or more PCIe endpoints 140 (the term "endpoint" is used in the PCIe specification to refer to PCIe enabled I/O adapters) via PCIe link 135. The root complex 120 denotes the root of an I/O hierarchy that connects the CPU/memory to the PCIe endpoints 140. The root complex 120 includes a host bridge, zero or more root complex integrated endpoints, zero or more root complex event collectors, and one or more root ports. Each root port supports a separate I/O hierarchy. The I/O hierarchies may be comprised of a root complex 120, zero or more interconnect switches and/or bridges (which comprise a switch or PCI fabric), and one or more endpoints, such as endpoint 140. For example, PCIe switches may be used to increase the number of PCIe endpoints, such as endpoint 140 attached to the root complex 120. For more information regarding PCI and PCIe, reference is made to the PCI and PCIe specifications available from the PCI-SiG website.

The PCIe endpoint includes internal routing circuitry 142, configuration management logic 144, one or more physical functions (PFs) 146 and zero or more virtual functions (VFs) 148-152, where each VF is associated with a PF. ATS permits each virtual function to make use of an address translation cache (ATC) 160-164 for caching PCI memory addresses that have already been translated and can be used by the virtual function to bypass the host ATPT 130 when performing DMA operations.

In operation, the PCIe endpoint 140 may invoke PCIe ATS transactions to request a translation of a given PCI bus address into a system bus address and indicate that a subsequent transaction, e.g., a DMA operation, has been translated and can bypass the ATPT. The root complex 120 may invoke PCIe ATS transactions to invalidate a translation that was provided to the PCIe endpoint 140 so that the translation is no longer used by the physical and/or virtual function(s) of the PCIe endpoint 140.

For example, when a DMA operation is to be performed, the address of the DMA operation may be looked-up in the ATC 160-164 of the particular virtual function 148-152 handling the DMA operation. If an address translation is not present in the ATC 160-164, then a translation request may be made by the PCIe endpoint 140 to the root complex 120. The root complex 120 may then perform address translation using the ATPT 130 and return the translated address to the PCIe endpoint 140. The PCIe endpoint 140 may then store the translation in an appropriate ATC 160-164 corresponding to the physical and/or virtual function that is handling the DMA operation. The DMA operation may be passed onto the system bus 115 using the translated address.

If a translation for this address is already present in the ATC 160-164, then the translated address is used with the DMA operation. A bit may be set in the DMA header to indicate that the address is already translated and that the ATPT 130 in the root complex 120 may be bypassed for this DMA. As a result, the DMA operation is performed directly between the PCIe endpoint 140 and the host CPUs and memory 110 via the PCIe link 135 and system bus 115. Access checks may still be performed by the root complex 120 to ensure that the particular BDF number of the virtual function of the PCIe endpoint corresponds to a BDF that is permitted to access the address in the manner requested by the DMA operation.

At some time later, if the translation that was provided to the PCIe endpoint 140 is no longer to be used by the PCIe endpoint 140, such as when a translation has changed within the ATPT 130, the root complex 120 must issue an ATS invalidation request to the PCIe endpoint 140. The PCIe endpoint 140 does not immediately flush all pending requests directed to the invalid address. Rather, the PCIe endpoint 140 waits for all outstanding read requests that reference the invalid translated address to retire and releases the translation in the ATC 160-164, such as by setting a bit to mark the entry in the ATC 160-164 to be invalid. The PCIe endpoint 140 returns an ATS invalidation completion message to the root complex 120 indicating completion of the invalidating of the translation in the ATC 160-164. The PCIe endpoint 140 ensures that the invalidation completion indication arrives at the root complex 120 after any previously posted writes that use the invalidated address.

Typically, the ATPT 130 may be provided as tree-structured translation tables in system memory. A different tree-structure may be provided for each PCI Bus/Device/Function (BDF) of the computing system. Using these ATPT data structures, devices may share a device address space and devices may have dedicated address spaces. Thus, not all devices may perform all DMA operations on all address spaces of the system memory.

The accessing of the ATPT 130 is done synchronously as part of the DMA transaction. This involves utilizing a time consuming translation mechanism for: translating the untranslated PCI bus memory addresses of the DMA transactions to translated real memory addresses used to access the host's memory; and checking the ATPT to ensure that the device submitting the DMA transaction has sufficient permissions for accessing the translated real memory addresses and has sufficient permissions to perform the desired DMA operation on the translated real memory addresses.

As part of accessing the ATPT 130, the correct ATPT tree data structure corresponding to a particular BDF must be identified and the tree data structure must be walked in order to perform the translation and access checking. The location of the ATPT tree data structure may require one or two accesses to find the address of the tree data structure associated with the BDF. Once found, it may take 3 or 4 accesses of the tree data structure to walk the tree. Thus, this translation and access checking is responsible for the large latencies associated with DMA operations. These latencies may cause serious issues with endpoints that require low communication latency.

As a way of mitigating these latencies, the ATS implemented in the PCIe endpoint 140 utilizes the ATCs 160-164 to store already performed address translations so that these translations need not be performed again. Thus, through a combination of the ATPT and the ATCs, the PCI ATS performs address translations and access checks in such a manner as to reduce the latency associated with DMA operations. While the PCI SiG has set forth a specification for the PCIe ATS, the PCI SiG has not specified how the responsibilities for performing address translation using ATS and managing ATS structures, such as the ATPT and ATCs, are to be apportioned in a system implementing the PCIe ATS.

SUMMARY

In one illustrative embodiment, a method, in a data processing system, is provided for establishing address translations for communicating between a device driver and an input/output (I/O) device. The method comprises creating, by the device driver, a queue data structure used to contain queue elements associated with communication between the device driver and the I/O device. The method further comprises initializing one or more address translation entries in an address translation data structure associated with a root complex of the data processing system for the queue data structure, in response to the device driver invoking device driver services. The one or more address translation entries specify one or more translations from one or more untranslated addresses to one or more translated memory addresses associated with the queue data structure. The method also comprises providing translation information, from the address translation data structure, for the one or more address translations associated with the queue data structure to the I/O device. In addition, the method comprises caching the address translation information in the I/O device for processing communications associated with the queue data structure. The one or more untranslated addresses comprise at least an untranslated starting address for the queue data structure and optionally comprise one of an untranslated ending address for the queue data structure or a length of the queue data structure.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise a processor and an input/output (I/O) endpoint coupled to the processor. The processor may execute instructions that cause the processor to create, by the device driver, a queue data structure used to contain queue elements associated with communication between the device driver and the I/O device. The instructions may further cause the processor to initialize one or more address translation entries in an address translation data structure associated with a root complex of the data processing system for the queue data structure, in response to the device driver invoking device driver services. The one or more address translation entries may specify one or more translations from one or more untranslated addresses to one or more translated memory addresses associated with the queue data structure. The one or more untranslated addresses comprise at least an untranslated starting address for the queue data structure and optionally comprise one of an untranslated ending address for the queue data structure or a length of the queue data structure.

The instructions may further cause the processor to provide translation information, from the address translation data structure, for the one or more address translations associated with the queue data structure to the I/O device and cache the address translation information in the I/O device for processing communications associated with the queue data structure.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 is a flowchart outlining an exemplary operation for initializing ATPT entries for DMA addresses in accordance with one illustrative embodiment;

FIG. 7 is a flowchart outlining an exemplary operation for invalidating ATPT entries and ATC entries for a DMA address in accordance with one illustrative embodiment;

FIGS. 13A-13B depict a flowchart outlining an exemplary operation for a receive operation of a network adapter in accordance with one illustrative embodiment;

FIGS. 14A-14B depict a flowchart outlining an exemplary operation for a transmit operation of a network adapter in accordance with one illustrative embodiment;

FIG. 15 is an exemplary diagram illustrating a SCSI read operation in accordance with one illustrative embodiment; and FIGS. 16A-16B illustrate a flowchart outlining an exemplary operation for reading data from a SCSI device in accordance with one illustrative embodiment.

DETAILED DESCRIPTION OF THE ILLUSTRATIVE EMBODIMENTS

Figure 1:
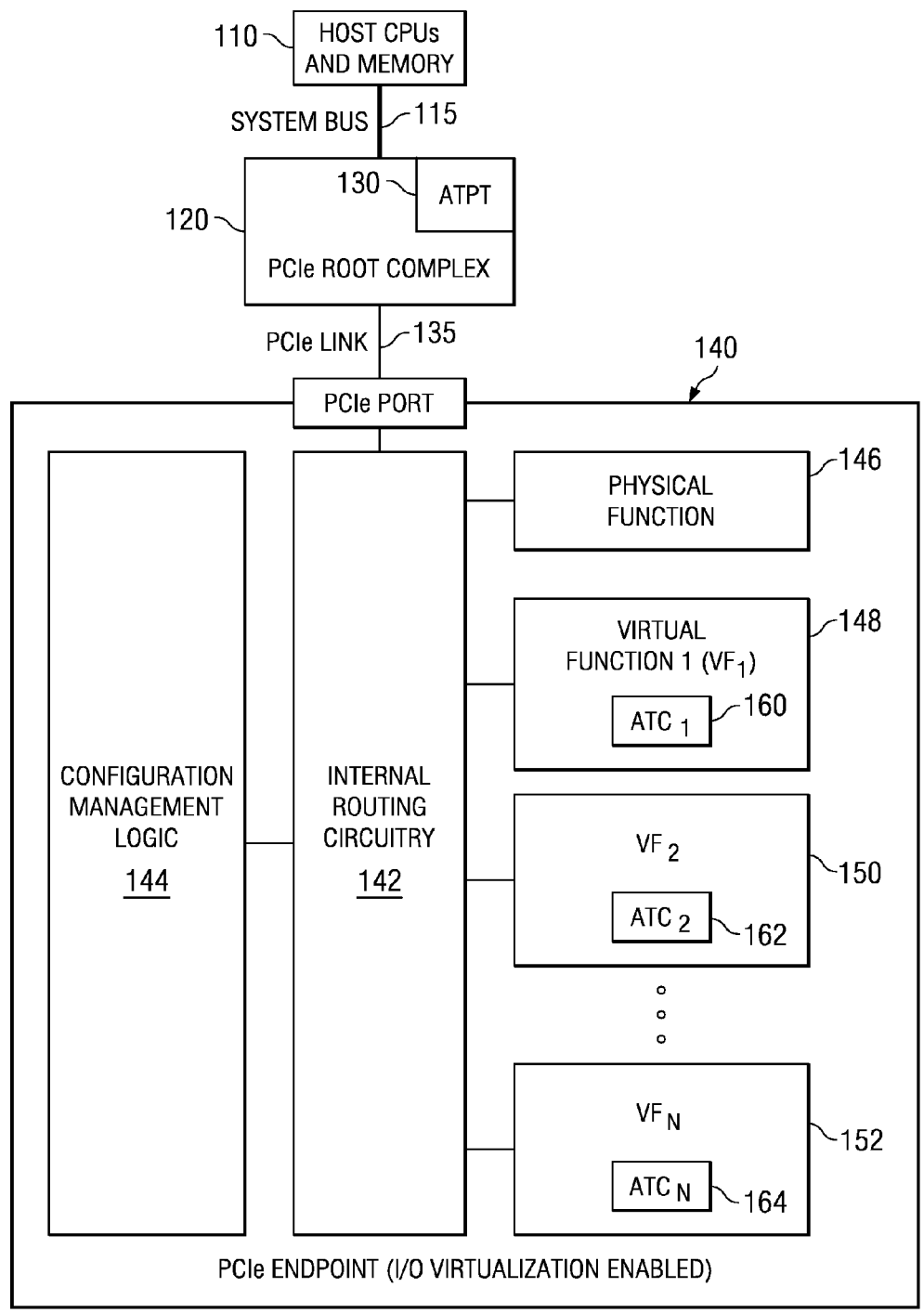
FIG. 1 is an exemplary diagram illustrating a conventional mechanism for performing DMA operations using an ATPT and the PCI express (PCIe) communication protocol.
Figure 2:
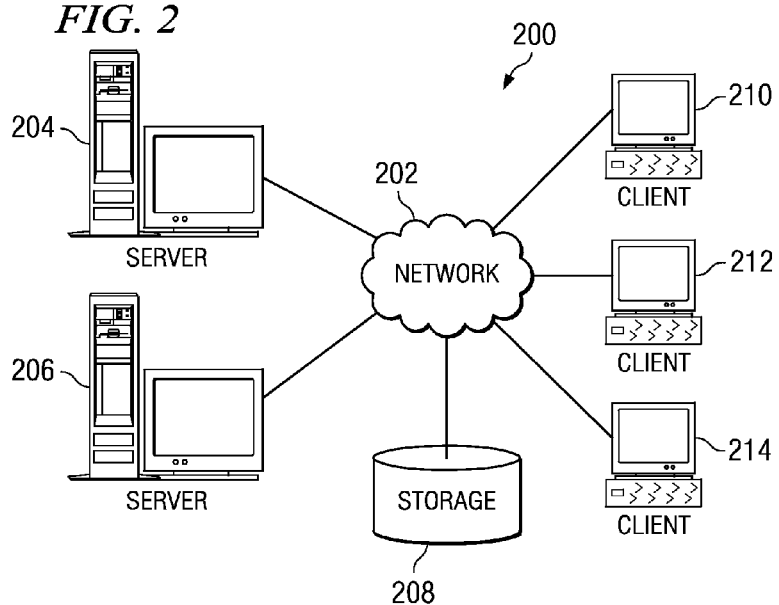
FIG. 2 is an exemplary diagram illustrating a distributed data processing environment in which exemplary aspects of the illustrative embodiments may be implemented.
Figure 3:
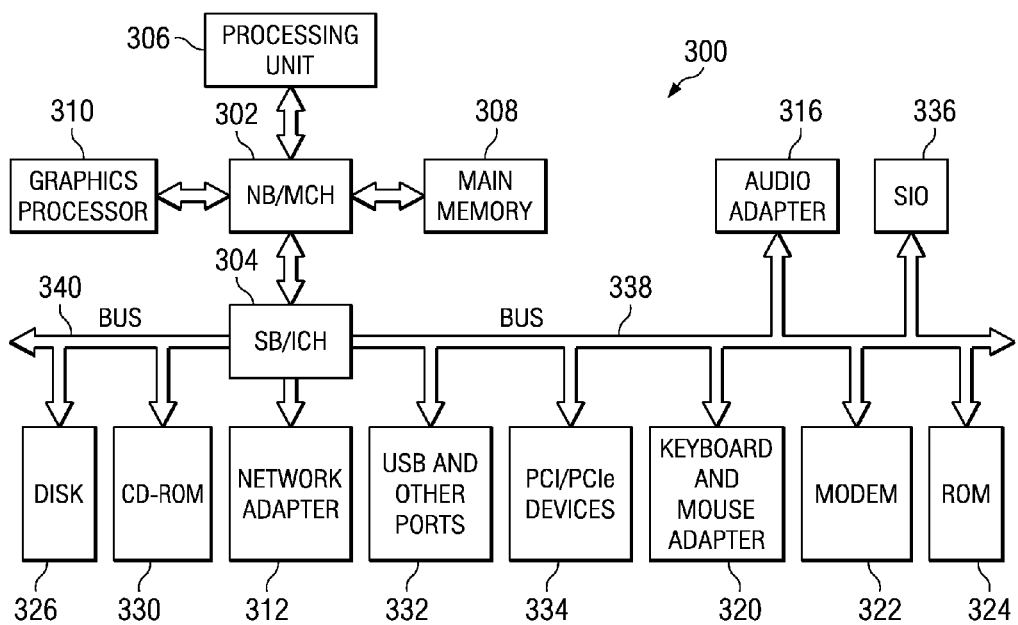
FIG. 3 is an exemplary diagram illustrating a data processing device in which exemplary aspects of the illustrative embodiments may be implemented.

The illustrative embodiments provide mechanisms by which endpoint address translation management responsibilities are distributed across a device driver and device driver services in order to facilitate more efficient Direct Memory Access (DMA) operations between an endpoint and a host system. As such, the illustrative embodiments may be implemented in any computing device in which DMA operations may be performed utilizing a device driver and device driver services, as described hereafter. Such computing devices may take many forms and may have various configurations. FIGS. 2-3 hereafter provide examples of a data processing environment and a data processing device in which exemplary aspects of the illustrative embodiments may be implemented. It should be appreciated that FIGS. 2-3 are only exemplary and are not intended to be limiting with regard to the types of data processing environments and devices in which the mechanisms of the illustrative embodiments may be utilized.

With reference now to the figures and in particular with reference to FIGS. 2-3, exemplary diagrams of data processing environments are provided in which embodiments of the present invention may be implemented. It should be appreciated that FIGS. 2-3 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 2 depicts a pictorial representation of an exemplary distributed data processing system in which aspects of the illustrative embodiments may be implemented. Distributed data processing system 200 may include a network of computers in which embodiments of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

With reference now to FIG. 3, a block diagram of an exemplary data processing system is shown in which aspects of the illustrative embodiments may be implemented. Data processing system 300 is an example of a computer, such as hosts 210 in FIG. 2, in which computer usable code or instructions implementing the processes for illustrative embodiments of the present invention may be located.

In the depicted example, data processing system 200 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 220, modem 322, read only memory (ROM) 324, hard disk drive (HDD) 326, CD-ROM drive 330, universal serial bus (USB) ports and other communication ports 232, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 204.

An operating system runs on processing unit 306. The operating system coordinates and provides control of various components within the data processing system 300 in FIG. 3. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 300 (Java is a trademark of Sun Microsystems, Inc. in the United States, other countries, or both).

As a server, data processing system 300 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

Those of ordinary skill in the art will appreciate that the hardware in FIGS. 2-3 may vary depending on the implementation. Other internal hardware or peripheral devices, such as flash memory, equivalent non-volatile memory, or optical disk drives and the like, may be used in addition to or in place of the hardware depicted in FIGS. 2-3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device which is configured with flash memory to provide non-volatile memory for storing operating system files and/or user-generated data, for example. Essentially, data processing system 300 may be any known or later developed data processing system without architectural limitation.

As mentioned above, the illustrative embodiments provide a system and method for distributing the responsibilities for endpoint address translation cache management between a device driver and device driver services. The device driver may be provided, for example, in an untrusted mission logical partition (LPAR) and the device driver services may be provided, for example, in a trusted input/output (I/O) virtualization intermediary (VI). While PCIe endpoints and the PCIe communication protocol will be used in the description of the illustrative embodiments, it should be appreciated that the illustrative embodiments are not limited to such and any communication protocol may be utilized without departing from the spirit and scope of the present invention.

With regard to the illustrative embodiments, the device driver is responsible for managing and utilizing queue structures for communicating between user applications/libraries and PCIe endpoints. The device driver is further responsible for invoking memory management services provided by the device driver services. The device driver services initialize and manage the address translation and protection table (ATPT) of the PCIe root complex of the computing system as well as address translation caches (ATCs) of the PCIe endpoints. The manner by which such initialization and management is performed will be described hereafter.

In one illustrative embodiment, during initialization of a device driver for a PCIe endpoint in a system image of a logical partition of the host system, the device driver for the PCIe endpoint invokes device driver services to initialize address translation and protection table (ATPT) entries and return a PCI memory address to the device driver. In one illustrative embodiment, these ATPT entries and PCI memory addresses are associated with one or more queues of the device driver, referred to as the "device driver's queues," for communicating with the PCIe adapter.

Essentially, the device driver services pin the host system memory for the one or more queues, assign DMA addresses to the one or more queues, program the ATPT entries and enable a bit stating that the ATPT entries are cacheable, i.e. cacheable in an address translation cache on the PCIe endpoint. The device driver services then return one or more untranslated PCIe memory addresses to the device driver for the ATPT entries that may be utilized, for example, as the addresses associated with the one or more queues (e.g., a starting address and, optionally, an ending queue address of a queue). An untranslated PCIe memory address is an address that is not in the system's real memory address space and must be translated before it can be used to access the system's real memory.

Using the mechanisms of the illustrative embodiments, the untranslated PCIe memory address(es) may be provided to the PCIe endpoint and used by the PCIe endpoint to perform a translation request operation with the root complex. That is, the PCIe endpoint may request that the root complex return a translated PCIe memory address or addresses corresponding to the untranslated PCIe memory address. The PCIe endpoint may then store the translated PCIe memory address or addresses in the context associated with the device driver's queue, e.g., in an address translation cache (ATC) of a virtual function in the PCIe endpoint.

Storing the translation of the untranslated PCIe memory address in the adapter's device driver queue context allows the PCIe endpoint to bypass the root complex's ATPT on DMAs that target device driver queue entries. Thus, when the root complex receives a PCIe DMA transaction marked as translated, the root complex verifies that translation caching is enabled for the endpoint and uses the translated PCIe memory address directly to access the host's real memory.

At some point in time later, such as after the PCIe endpoint is removed from the system, after the function (physical or virtual) associated with the device driver is removed from the system, or the like, the ATPT entries and ATC entries corresponding to the untranslated PCIe memory address may need to be invalidated. In order to perform such invalidation, the device driver or some higher level entity, such as a hypervisor management component, invokes the device driver services to unpin the host memory and release the DMA address, i.e. the untranslated PCIe memory address. The device services then clear the ATPT entries corresponding to the untranslated PCIe memory address and the root complex issues an ATC entry invalidation request to the PCIe endpoint.

The PCIe endpoint then performs operations to invalidate any ATC entries corresponding to the untranslated PCIe memory address and, after the untranslated PCIe memory addresses are no longer in use, returns an ATC invalidation completion response to the device services. The device driver services then return control to the device driver. An alternate implementation consists of having the driver services issue the ATC entry invalidation request to the PCIe endpoint and, after the PCIe endpoint completes the ATC entry invalidation, device driver services clear the ATPT entries and returns to the device driver.

Figure 4:
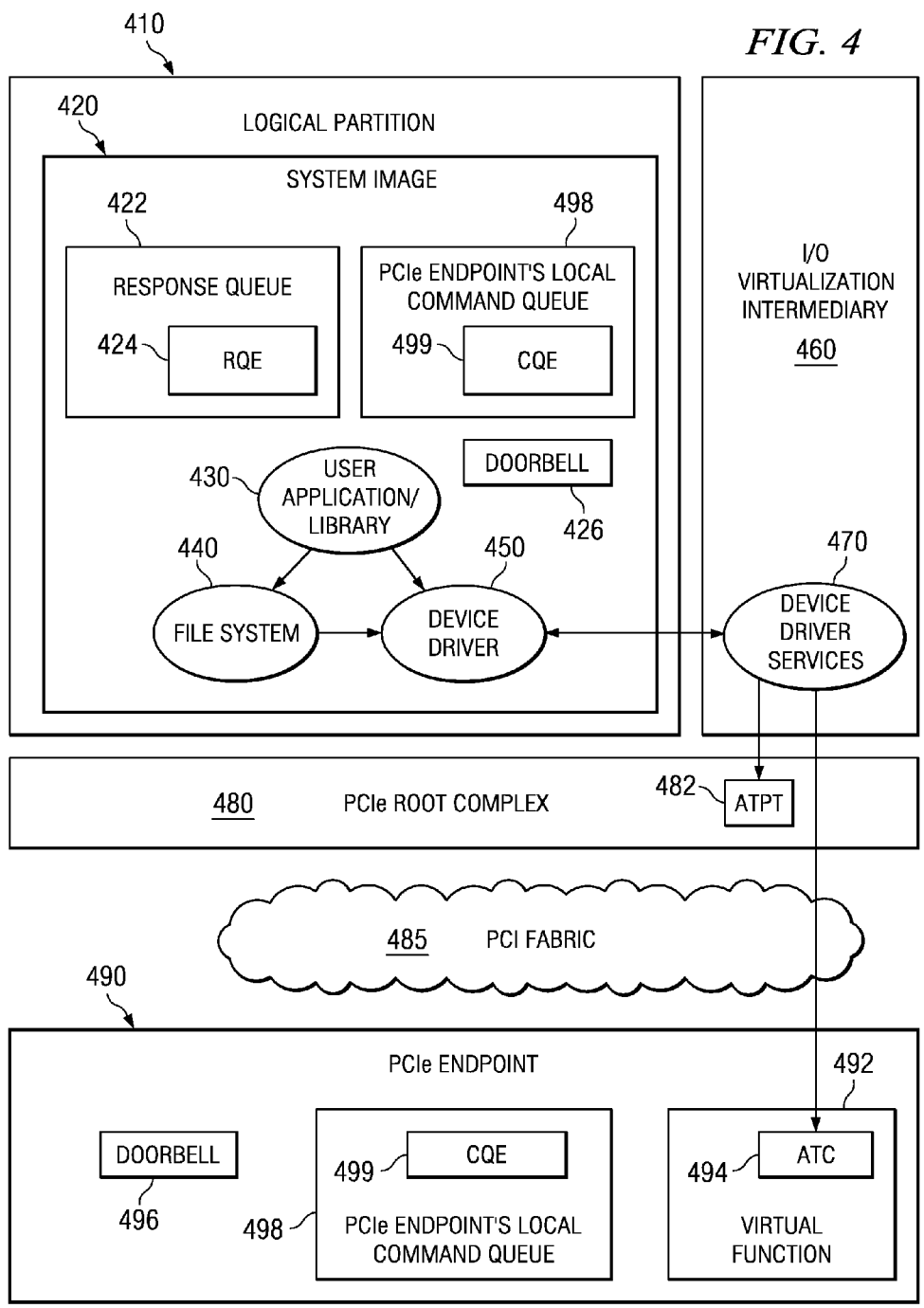
FIG. 4 is an exemplary diagram illustrating the operation of one illustrative embodiment with regard to a device driver and device driver services.

FIG. 4 is an exemplary diagram illustrating the operation of one illustrative embodiment with regard to a device driver and device driver services. As shown in FIG. 4, a host system may have one or more logical partitions 410 in which a system image 420, e.g., an operating system or the like, may execute. The system image 420 may be utilized to execute user applications 430 with access to application libraries and the like. The system image 420 has an associated file system 440 through which files, device drivers, libraries, and other software resources may be accessed. A device driver 450 may be provided in the system image 420 for communicating between the system image 420 and the PCIe adapter 490.

The device driver 450 further has an associated response queue 422 through which the user application 430, system image 420, and the like, may communicate with a PCIe endpoint 490. The response queue 422 has response queue entries (RQEs) 424 for operations the PCIe endpoint 490 wants to be performed by the device driver 450, user application 430, system image 420, host system memory, and other host system resources. A doorbell storage device 426 is provided in association with the response queue 422 and system image 420 for informing the system image 420 when the response queue 422 has a response queue entry 424 that needs to be processed. Examples of work that may be performed by such a queue include completion processing associated with work system image 420 requested from the PCIe endpoint 490, asynchronous event processing associated with errors or events surfaced by the PCIe endpoint 490 to system image 420, and the like.

Similarly, the PCIe endpoint 490 may have an associated PCIe endpoint command queue 498 in which command queue entries (CQEs) 499 may be provided for informing the PCIe endpoint 490 of operations the system image 420, user applications 430, or the like, wants to be performed by the PCIe endpoint 490. The PCIe endpoint 490 command queue 498 may be implemented in the PCIe endpoint 490 itself or, more commonly, in a system image 420 memory location that is accessible by the PCIe endpoint 490, as depicted. A doorbell storage device 496 may be provided in the PCIe endpoint 490 for informing the PCIe endpoint 490 of when a CQE 499 is present in the PCIe endpoint command queue 498 for processing.

The PCIe endpoint 490 further has one or more physical functions (not shown) and virtual functions 492. The virtual functions 492 may further maintain an address translation cache (ATC) 494 for caching translated addresses for use in performing direct memory access (DMA) operations with host system memory, for example. The ATCs 494 may be stored in a device driver's queue context at the PCIe endpoint 490.

The PCIe endpoint 490 is coupled to the host system via a PCI fabric 485, which may be comprised of communication links, one or more PCI switches, and the like. The host system has a PCIe root complex 480 for communicating with the PCIe endpoint 490 via the PCI fabric 485. The root complex 480 maintains an address translation and protection table (ATPT) 482 which is used to translate untranslated PCIe memory addresses into translated addresses used in the system's real memory address space.

Management of the ATPT 482 and the ATC 494 is performed by device driver services 470 provided in an input/output (I/O) virtualization intermediary (VI) 460. The IOVI 460 may be, for example, a hypervisor or other virtualization management component, such as a trusted service partition. The device driver services 470 may be invoked by the device driver 450 when needed to initialize and invalidate entries in the ATPT 482 and the ATC 494.

The responsibilities for managing communications between the host system and the PCIe endpoint are split between the device driver 450 and the device driver services 470. Specifically, the device driver 450 is responsible for managing its response queue 422 and the PCIe endpoint's command queue 498. The device driver 450 is further responsible for invoking the device driver services 470 when needed to perform the necessary functions for initializing address translation entries in the ATPT 482 and for invalidating entries in the ATPT 482 and the ATC 494 when the translations are no longer to be used by the PCIe endpoint 490.

During initialization of the device driver 450, the device driver 450 may initialize a DMA address space for one or more queues, such as a device driver response queue 422, a PCIe endpoint's command queue 498 that resides in system image 420 for communicating with the PCIe endpoint 490, and the like. In turn, the device driver 450 for the PCIe endpoint 490 invokes device driver services 470 to initialize ATPT 482 entries for translating PCIe addresses into DMA address space addresses for accessing portions of system memory. Each ATPT entry is for one set of contiguous PCI bus addresses. The mechanism for initialization address translation and protection table entries is generally known in the art. For example, a mechanism for initializing such entries is described in commonly assigned U.S. Pat. No. 6,629,162. The device driver services 470 then return one or more PCI memory address to the device driver 450.

Essentially, in the depicted example, the device driver services 470 pin the host system memory for the response queue 422 and the PCIe endpoint's command queue 498, if it resides in system image 420. The device driver services 470 assign DMA addresses, which are untranslated PCIe memory addresses, to the device driver's response queue 422 and the PCIe endpoint's command queue 498, if it resides in system image 420. The device driver services 470 program the ATPT entries and enable a bit stating that the ATPT entries for the device driver's response queue 422 and the PCIe endpoint's command queue 498, if it resides in system image 420, are cacheable, i.e. cacheable in the ATC 494 on the PCIe endpoint

490. The device driver services 470 then return an untranslated PCIe memory address to the device driver 450 for the ATPT entries.

Using the mechanisms of the illustrative embodiments, the untranslated PCIe memory address(es) may then be provided to the PCIe endpoint 490 to inform the PCIe endpoint 490 of the location of queues 422 and 498. The untranslated PCIe memory address(es) may be used by the PCIe endpoint 490 to send a translation request operation to the root complex 480. That is, the PCIe endpoint 490 may request that the root complex 480 return translated PCIe memory address(es) associated with the untranslated PCIe memory address. The PCIe endpoint 490 may then store the translated PCIe memory address(es) in the context associated with the device driver's queues, e.g., ATC 494. As a result, the storing of the translation of the untranslated PCIe memory address in the PCIe endpoint's device driver queue context or ATC 494 allows the PCIe endpoint 490 to bypass the root complex's ATPT 482 on DMAs that target device driver queue entries, e.g., RQE 424 in response queue 422. That is, when the root complex 480 receives a PCIe DMA transaction marked as translated, it will verify that translation caching is enabled for the PCIe endpoint 490 and use the translated PCIe memory address directly to access the host system's real memory.

At some point in time later, such as after the PCIe endpoint 490 is removed from the system, after the function (physical or virtual) associated with the device driver 450 is removed from the host system, or the like, the ATPT entries and ATC entries corresponding to the untranslated PCIe memory address(es) may need to be invalidated. In order to perform such invalidation, the device driver 450, hypervisor management component, or the like, invokes the device driver services 470 to unpin the host memory and release the DMA address(es), i.e. the untranslated PCIe memory address(es). The device driver services 470 then clears the ATPT entries in the ATPT 482 corresponding to the untranslated PCIe memory address(es), e.g., by setting a bit in the ATPT 482 stating that the entry is no longer valid or by "zero'ing" the ATPT entry to indicate it is no longer valid.

The root complex 480 then issues an ATC entry invalidation request to the PCIe endpoint 490. The PCIe endpoint 490 then performs operations to invalidate any ATC entries in the ATC 494 corresponding to the untranslated PCIe memory address(es). Such invalidation may involve, for example, removing the cached translation from the queue contexts, e.g., ATC 494, of any virtual functions that were caching the translation. After the untranslated PCIe memory addresses are no longer in use, i.e. when all outstanding DMA operations that reference the untranslated PCIe memory address complete, the PCIe endpoint 490 returns an ATC invalidation completion response to the device driver services 470. The device driver services 470 then return control to the device driver 450. In an alternate implementation, the device driver services 470 may issue the ATC entry invalidation request to the PCIe endpoint 490 and, after the PCIe endpoint 490 completes the ATC entry invalidation, the device driver services 470 may clear the ATPT entries in the ATPT 482 and return to the device driver 450.

Figure 5:
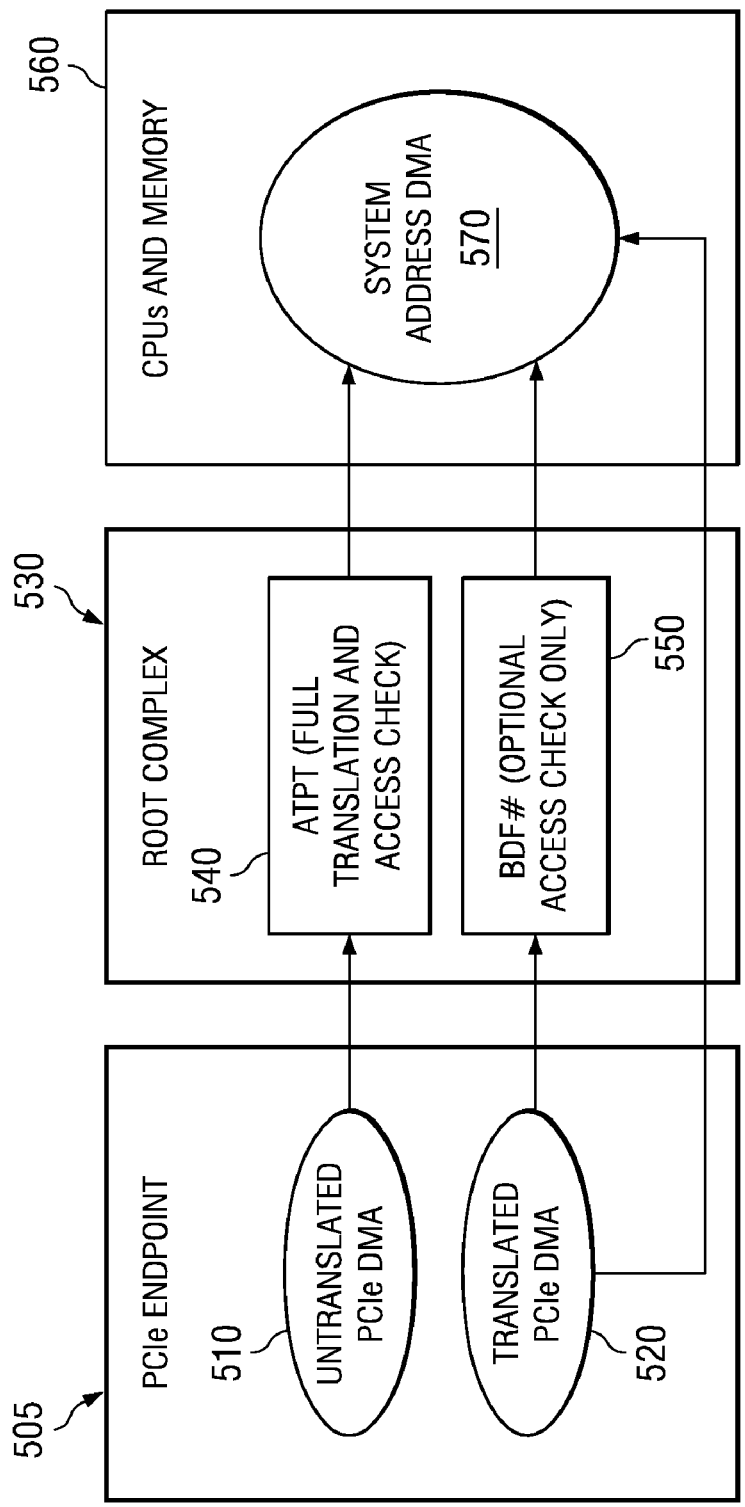
FIG. 5 is an exemplary diagram illustrating the handling of translated and untranslated PCIe addresses with DMA operations in accordance with one illustrative embodiment.

FIG. 5 is an exemplary diagram illustrating the handling of translated and untranslated PCIe addresses with DMA operations in accordance with one illustrative embodiment. The operation shown in FIG. 5 assumes that appropriate ATPT entries for the DMA operations have been initialized using the device driver and device driver services, as described previously. FIG. 5 shows one operation for a DMA using an untranslated PCIe address being sent from the PCIe endpoint 505 to the CPUs and memory 560 of the host system, and another operation for a DMA using a translated PCIe address being sent from the PCIe endpoint 505 to the CPUs and memory 560.

As shown in FIG. 5, when a DMA operation request is generated or received in a virtual function of the PCIe endpoint 505, a check of the corresponding ATC may be performed to determine if an address translation for the untranslated PCIe address is present in the ATC. If an entry for the untranslated PCIe address is not present in the ATC, the DMA operation request is forwarded to the root complex 530 as an untranslated PCIe DMA 510 that uses the untranslated PCIe address. If an entry is available in the ATC, and the entry has not been invalidated, then the translated address may be used in place of the untranslated PCIe address for the DMA. As a result, a translated PCIe DMA utilizing the translated address 520 is forwarded to the root complex 530.

For untranslated PCIe DMAs 510, since the untranslated PCIe address is not in the host system memory address space, it is necessary to first translate the untranslated PCIe address into a host system memory address. This translation is done by the root complex 530, using the ATPT. In addition, the root complex 530 further performs an access check based on the BDF number of the PCIe endpoint 505 and the entries in the ATPT. That is, the root complex 530 looks up an entry corresponding to the untranslated PCIe address in the ATPT 540, gets the translated host system memory addresses corresponding to the untranslated PCIe address, and the corresponding protection information for the translated host system memory address. The protection information may identify which BDF numbers may access the corresponding host system addresses, and the particular operations that they may perform on the portions of system memory corresponding to these host system memory addresses.

If the PCIe endpoint 505 is permitted to access the portion of system memory corresponding to the translated system memory address and is permitted to perform the requested DMA operation (e.g., read/write), then the DMA operation request is forwarded to the CPUs and memory 560 using the translated system memory address 570. If the PCIe endpoint 505 is not permitted to access the portion of system memory, an error message may be returned and the DMA operation request may not be forwarded on to the CPUs and memory 560.

The translated system memory address for the untranslated PCIe address may be returned to the PCIe endpoint 505. The PCIe endpoint 505 may then store the translation in the ATC of the virtual function that submitted the DMA operation request, as described above with regard to FIG. 4. In this way, rather than having to perform this translation subsequently, the translated system memory address may be accessed in the PCIe endpoint via the ATC, thereby saving the cycles required for the ATPT translation of untranslated PCIe addresses.

For a translated PCIe DMA 520, since the PCIe address has already been translated into a system memory address by virtue of the ATC of the virtual function in the PCIe endpoint 505, the DMA operation may pass directly through the root complex 530 to the CPUs and memory 560. For example, the translated PCIe DMA 520 has a bit set in the DMA header (e.g., set by the PCIe endpoint 505) indicating that the address specified in the header of the DMA operation request is a translated address. The root complex 530 may read this bit and determine whether the bit indicates the address in the DMA operation request to be a translated or untranslated address.

If the root complex 530 determines the address to be an untranslated address, the operation outlined above with regard to the untranslated PCIe DMA operation request 510 is performed. If the root complex 530 determines that the address is a translated address, then the root complex 530 may pass the DMA operation request 520 through to the CPUs and memory 560. Optionally, an access check based on the BDF number of the PCIe endpoint 505 may still be performed to ensure that the PCIe endpoint is permitted to access the portion of system memory corresponding to the translated system memory address. This access check may be very simple, such as a general check to determine if the BDF number is allowed to cache address translations and if so, the check is successful. If the BDF number is not permitted to cache address translations, then the access check fails.

Figure 8:
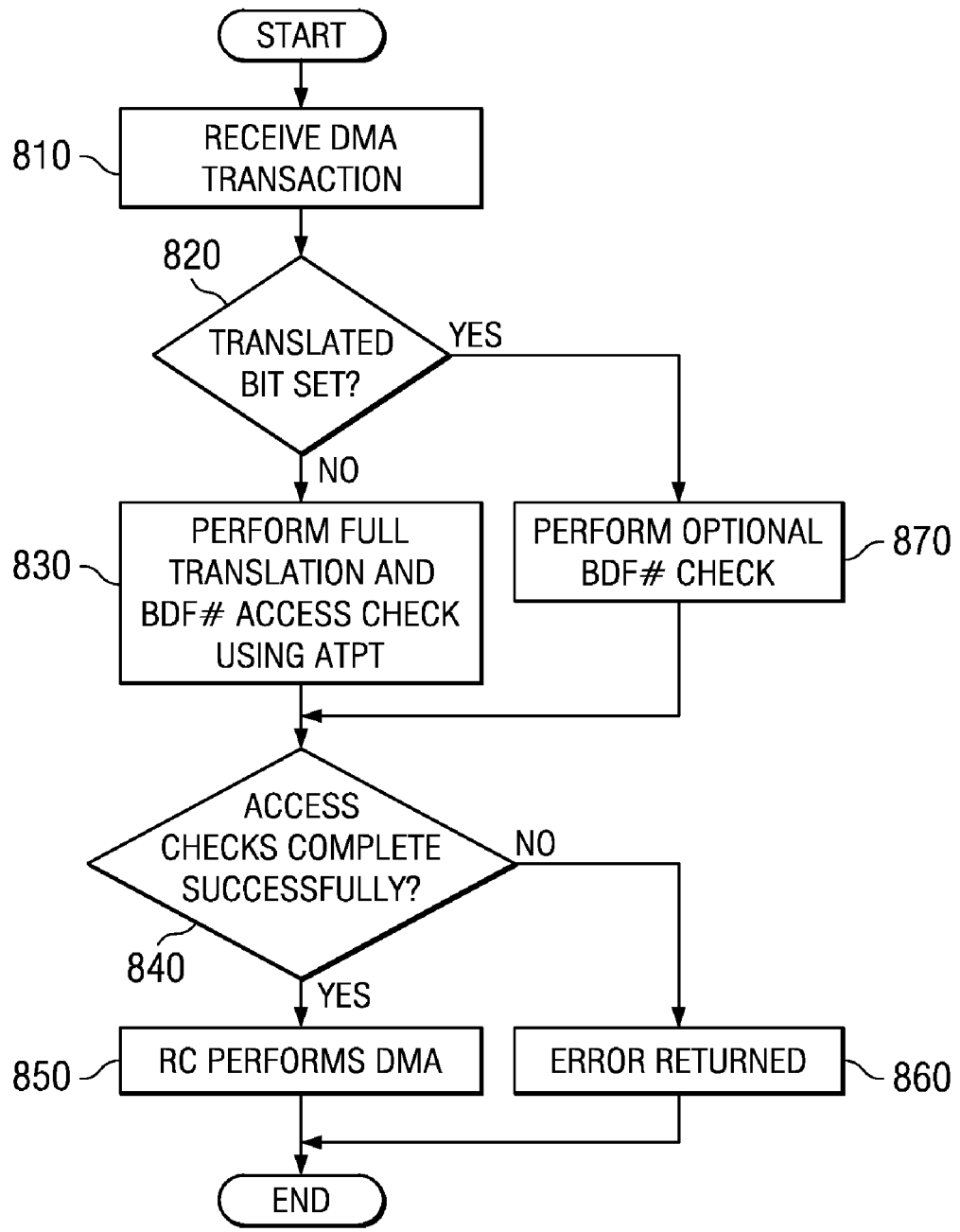
FIG. 8 is a flowchart outlining an exemplary operation for handling translated and untranslated PCIe addresses in DMA operations in accordance with one illustrative embodiment.

FIGS. 6-8 outline exemplary operations of various elements of the illustrative embodiments. It will be understood that each block of these flowchart illustrations, flowchart illustrations thereafter, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 6 is a flowchart outlining an exemplary operation for initializing ATPT entries for DMA addresses in accordance with one illustrative embodiment. As shown in FIG. 6, the operation starts with initialization, by the host system, of the device driver for the PCIe endpoint as part of the initialization of the system image on the host system (step 610). The host system calls the device driver in the logical partition which in turn calls device driver services in the I/O virtualization intermediary (step 620). The device driver services pin the host system memory (step 630).

The device driver services assign DMA addresses to the PCIe endpoint (step 640). The device driver services program the ATPT entries for the DMA addresses and set the cache enable bit, if appropriate, in the ATPT entries (step 650). The device driver services then return the untranslated PCIe memory address(es) to the device driver (step 660) and the operation terminates.

FIG. 7 is a flowchart outlining an exemplary operation for invalidating ATPT entries and ATC entries for a DMA address in accordance with one illustrative embodiment. As shown in FIG. 7, the operation starts with the device driver calling the device driver services (step 710). The device driver services releases the DMA addresses (step 720) and then clear the ATPT entries for the DMA addresses (step 730).

The root complex issues an ATC entry invalidation request to PCIe endpoint (step 740). The PCIe endpoint invalidates the ATC entry corresponding to the DMA address that is to be invalidated (step 750). The device driver services wait for an ATC invalidation completion response to be received (step 760). Once the ATC invalidation completion response is received, the device driver services may unpin the host system memory (step 770) and return control to the device driver once the ATC invalidation is completed (step 780). The operation then terminates.

FIG. 8 is a flowchart outlining an exemplary operation for handling translated and untranslated PCIe addresses in DMA operations in accordance with one illustrative embodiment. As shown in FIG. 8, the operation starts with receiving, in the root complex, a DMA transaction (step 810). The root complex determines whether the translated bit is set (step 820). If the translated bit is not set, the root complex performs a full transformation and BDF number access check using the ATPT (step 830).

Thereafter, two paths of operation are followed. In a first path, a determination is made as to whether the source of the DMA operation is permitted to perform the translated DMA operation, i.e. a determination as to whether the access checks complete successfully (step 840). If not, an error is returned (step 860). If the source is permitted to perform the translated DMA operation, then the root complex performs the DMA (step 850). The operation then terminates.

If the translated bit is set (step 820), an optional BDF number access check may be performed (step 870). The operation continues to step 840 bypassing the address translation of step 830.

Thus, the illustrative embodiments provide a mechanism by which device driver services are invoked to initialize and invalidate address translations in an address translation data structure of a root complex of a host system. These device driver services may be provided in an I/O virtualization intermediary and may be invoked by a device driver provided in a logical partition in association with a system image. The device driver services may, through the root complex, create address translation data structure entries for translating virtual addresses, e.g., untranslated PCIe addresses, into system memory addresses. Moreover, the device driver services may, through the root complex, clear address translation entries from the address translation data structure and, through the PCIe endpoint, invalidate entries in any address translation caches of the PCIe endpoint.

As mentioned above, the mechanisms of the illustrative embodiments may be utilized to establish ATPT entries for use in communicating between the system image, applications running in the system image, etc., and the PCIe endpoint using one or more queue data structures. In such an implementation of the illustrative embodiments, the ATPT entries for the one or more queue data structures are initialized in the manner previously described above. During the PCIe endpoint's initialization phase, the PCIe endpoint verifies that the device driver has been initialized. This may be done, for example, by reading information from a PCI configuration space, a Vital Product Data (VPD) field, or a memory mapped input/output (MMIO) field of the PCIe endpoint.

The device driver may provide the start and ending addresses, the starting address and a length, or the like, of the one or more queues to the PCIe endpoint. For example, the device driver may write these addresses into a PCI configuration space field, VPD or MMIO field of the PCIe endpoint corresponding to a queue configuration space. These addresses are untranslated PCIe addresses. The PCIe endpoint may invoke a PCIe ATS request for translation of the queue addresses. As a result, the root complex may use the ATPT to perform address translation and return the result to the PCIe endpoint which may cache the translated addresses in a queue context for use in retrieving items from the one or more queues and to place items in the one or more queues. By pre-translating the queue addresses in this way, the latency involved in starting an I/O operation is reduced by moving the latency of the translation operation from the start of each operation to prior to any operation starting, thus improving the overall performance of DMA operations of the endpoint.

Figure 9:
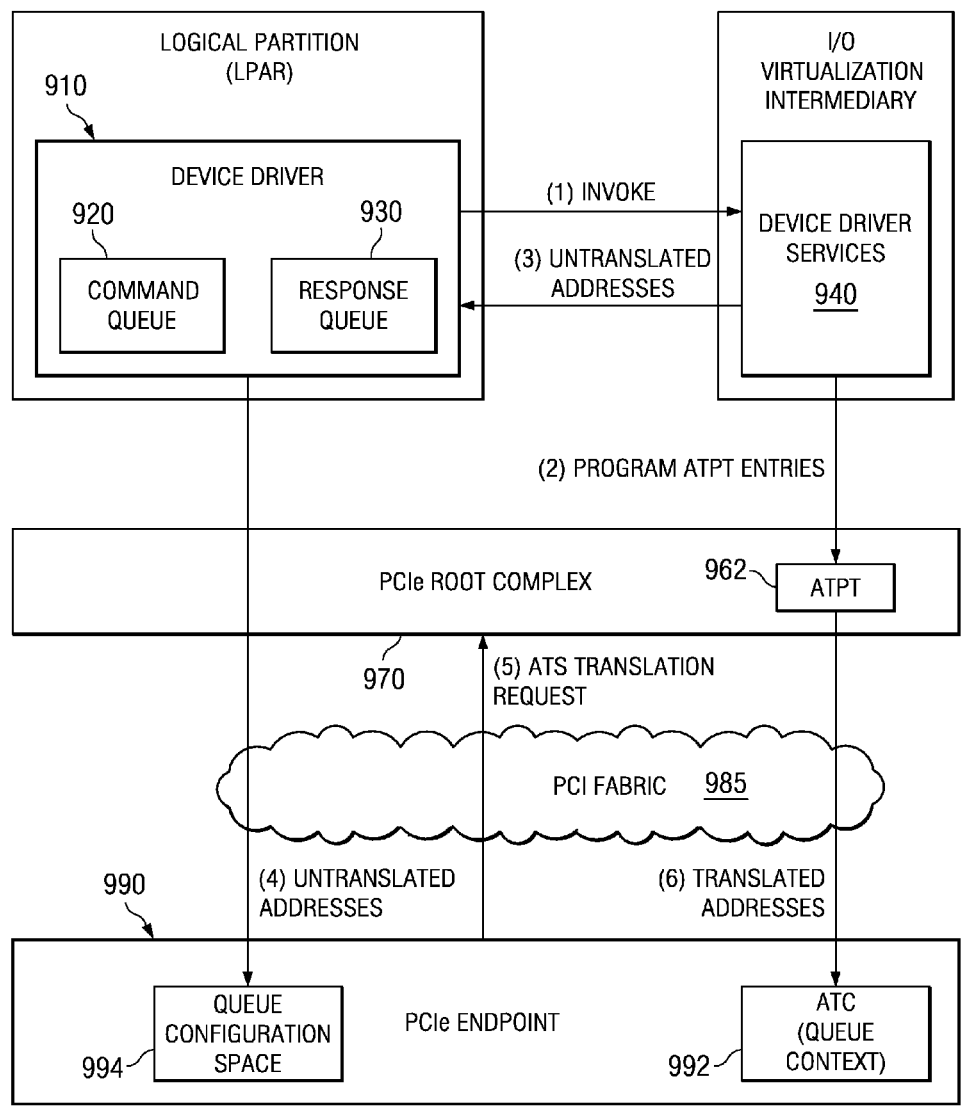
FIG. 9 illustrates an implementation of the illustrative embodiments for caching address translations for PCIe endpoint queues.

FIG. 9 illustrates an implementation of the illustrative embodiments for caching address translations for PCIe endpoint queues. As shown in FIG. 9, the device driver 910 generates queue data structures 920-930 for communicating with a PCIe endpoint 990. In the depicted example, the queue data structures 920-930 comprise a command queue 920, which may be equivalent to the PCIe endpoint's command queue 498 in FIG. 4, for example, and a response queue 930, which may be equivalent to the response queue 422 in FIG. 4, for example. It should be appreciated that the number of queues that may be established by the device driver 910 are not limited to two, and a smaller or greater number of queues may be utilized without departing from the spirit and scope of the present invention.

The queue data structures 920-930 may be small component system interface (SCSI) queues for communicating with SCSI I/O devices coupled to the PCIe endpoint 990, for example. These queue data structures may be configured in any manner including linked list queues, circular buffer queues, or the like.

As part of the operation performed by the device driver 910 in generating these queue data structures 920-930, the device driver 910 invokes the device driver services 940 to program the ATPT entries for the queue data structures 920-930 and return an untranslated PCIe address for the queues to the device driver 910. As previously described above, in the illustrative embodiments, the programming of the ATPT entries may involve pinning the host memory space 950 used for the queue data structures, programming the ATPT entries in the ATPT 960 of the root complex 970 with the translation information for translating from a untranslated PCIe address to a system memory address, and setting a cache enable bit in the ATPT entries indicating that the address translations corresponding to the ATPT entries are cacheable in an ATC 992 of the PCIe endpoint 990. After performing such operations, the untranslated PCIe addresses for the ATPT entries are returned to the device driver 910. These untranslated PCIe addresses may identify, for example, the start and end addresses of the queue data structures 920-930.

The untranslated PCIe addresses are provided by the device driver 910 to the PCIe endpoint 990, such as by writing the addresses to a queue configuration space 994 in the PCIe endpoint 990. The queue configuration space 994 may be, for example, a PCI configuration space, one or more VPD fields, one or more MMIO fields, or the like. In response to receiving these untranslated PCIe addresses for the queue data structures 920-930, the PCIe endpoint 990 may issue a PCIe ATS request for the queue addresses to the root complex 970. As a result, the root complex 970 may perform address translation and access checks for the untranslated PCIe addresses of the queue data structures 920-930 and return the translated addresses to the PCIe endpoint 990. The PCIe endpoint 990 may then store these address translations in a queue context provided by the address translation cache (ATC) 992 of the PCIe endpoint 990.

As a result of the above, since the PCIe endpoint now has access to the translations for the addresses associated with the queue data structures 920-930, the PCIe endpoint may now perform DMA operations to submit or retrieve queue entries to/from the queue data structures 920-930 without having to go through the root complex 970 ATPT address translation.

Once the queue data structures 920-930 are no longer to be utilized by the PCIe endpoint 990, the ATPT and ATC entries corresponding to the addresses for these queue data structures 920-930 may be invalidated in the manner previously described above. Such invalidation may be performed, for example, when the PCIe endpoint is to be removed from the system, after the function (physical or virtual) associated with the device driver is removed from the host system, or the like. As described previously, this process of invalidation may involve the device driver 910 invoking the device driver services 940 to unpin the host system memory 950 corresponding to the queue data structures 920-930, releasing the DMA addresses for these queue data structures 920-930, clearing the ATPT entries for these DMA addresses, and issuing an ATC entry invalidation request to the PCIe endpoint 990. When the ATC entry invalidation operation is completed by the PCIe endpoint 990, the device driver services 940 returns control to the device driver 910 and at this point the PCIe endpoint 990 may be removed from the system.

Figure 10:
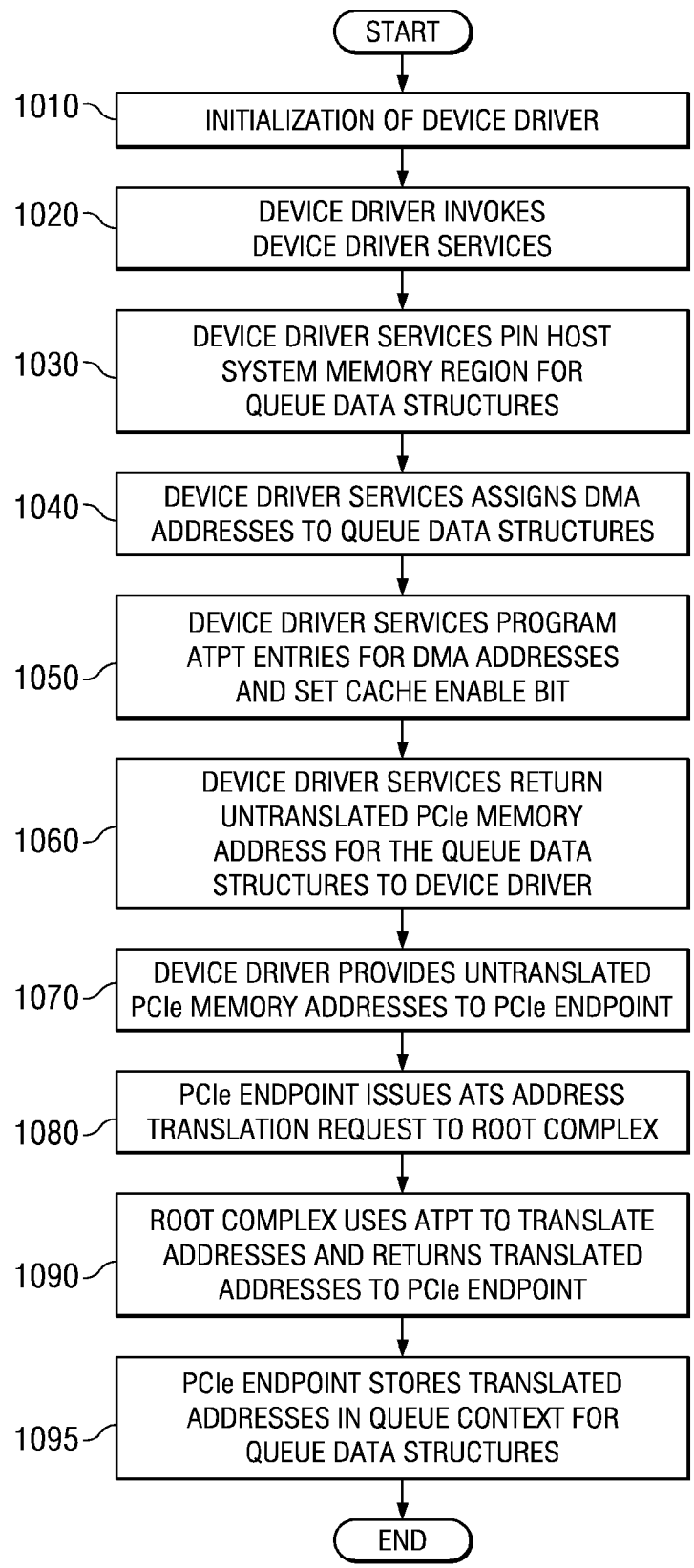
FIG. 10 is a flowchart outlining an exemplary operation for initializing a queue data structure for communication between a host system and a PCIe endpoint in accordance with one illustrative embodiment.

FIG. 10 is a flowchart outlining an exemplary operation for initializing a queue data structure for communication between a host system and a PCIe endpoint in accordance with one illustrative embodiment. Since the operation for invalidation of the addresses of a queue data structure is essentially the same as the operation outlined in FIG. 7 above, only the initialization operation for a queue data structure will be specifically illustrated by a flowchart in the present description.

As shown in FIG. 10, the operation starts with initialization, by the host system, of the device driver for the PCIe endpoint as part of the initialization of the system image on the host system (step 1010). The host system calls the device driver in the logical partition which in turn calls device driver services in the I/O virtualization intermediary (step 1020). The device driver services pin the host system memory for the queue data structure(s) (step 1030).

The device driver services assign untranslated DMA addresses, i.e. untranslated PCIe memory addresses, to the queue data structure(s) (step 1040). The device driver services program the ATPT entries for the untranslated DMA addresses and set the cache enable bit, if appropriate, in the ATPT entries (step 1050). The device driver services then return the untranslated DMA addresses, i.e. the untranslated PCIe memory addresses for the queue data structures to the device driver (step 1060).

The device driver then provides the untranslated DMA addresses for the queue data structures to the PCIe endpoint (step 1070). The PCIe endpoint issues an ATS address translation request to the root complex (step 1080). The root complex uses the ATPT to perform address translation of the untranslated DMA addresses and returns the translated addresses to the PCIe endpoint (step 1090). The PCIe endpoint stores the translated addresses in a queue context for the queue data structures (step 1095) and the operation terminates. Thereafter, the PCIe endpoint may use the translated addresses in the queue context to DMA requests to and from the queue data structures.

Thus, the illustrative embodiments provide a mechanism by which one or more queues for communicating between a system image, applications running in the system image, or the like, and a PCIe endpoint, e.g., an I/O adapter, may be created. The mechanisms of the illustrative embodiments provide for the initialization and usage of ATPT entries in a root complex for translating addresses associated with the one or more queues from an untranslated address space, e.g., PCIe bus address space, to a translated address space, e.g., system bus address space. Moreover, the illustrative embodiments provide mechanisms for storing translations in the PCIe endpoint as part of an address translation cache so that requests using untranslated addresses matching these translations may be directly forwarded to the one or more queues without having to go through formal translation in the root complex.

As described above, the mechanisms of the illustrative embodiments may be utilized to establish queue data structures in a device driver and their corresponding ATPT entries in the root complex of a data processing system. Once such queue data structures are initialized through the mechanisms described above, communication between the application instances, system image, and the like, of a logical partition of the host system and a PCIe endpoint may be performed using these queue data structures and ATPT entries.

These queue data structures and corresponding ATPT entries may be utilized with PCIe endpoints of different types. For example, the PCIe endpoint may be a networking adapter, such as an Ethernet adapter, Fibre Channel adapter, InfiniBand™ adapter, or the like, for communicating with other devices over one or more data networks. With such networking adapters, data that is being transmitted or received is placed into a buffer in the host system's device driver and fetched by either the host system's system image or the network adapter, depending upon whether the data is being received or transmitted. By pre-translating the data buffer addresses, the latency involved in starting an I/O operation is reduced by moving the latency of the translation operation from the start of each operation to prior to any operation starting, thus improving the overall performance of DMA operations of the endpoint.

Figure 11:
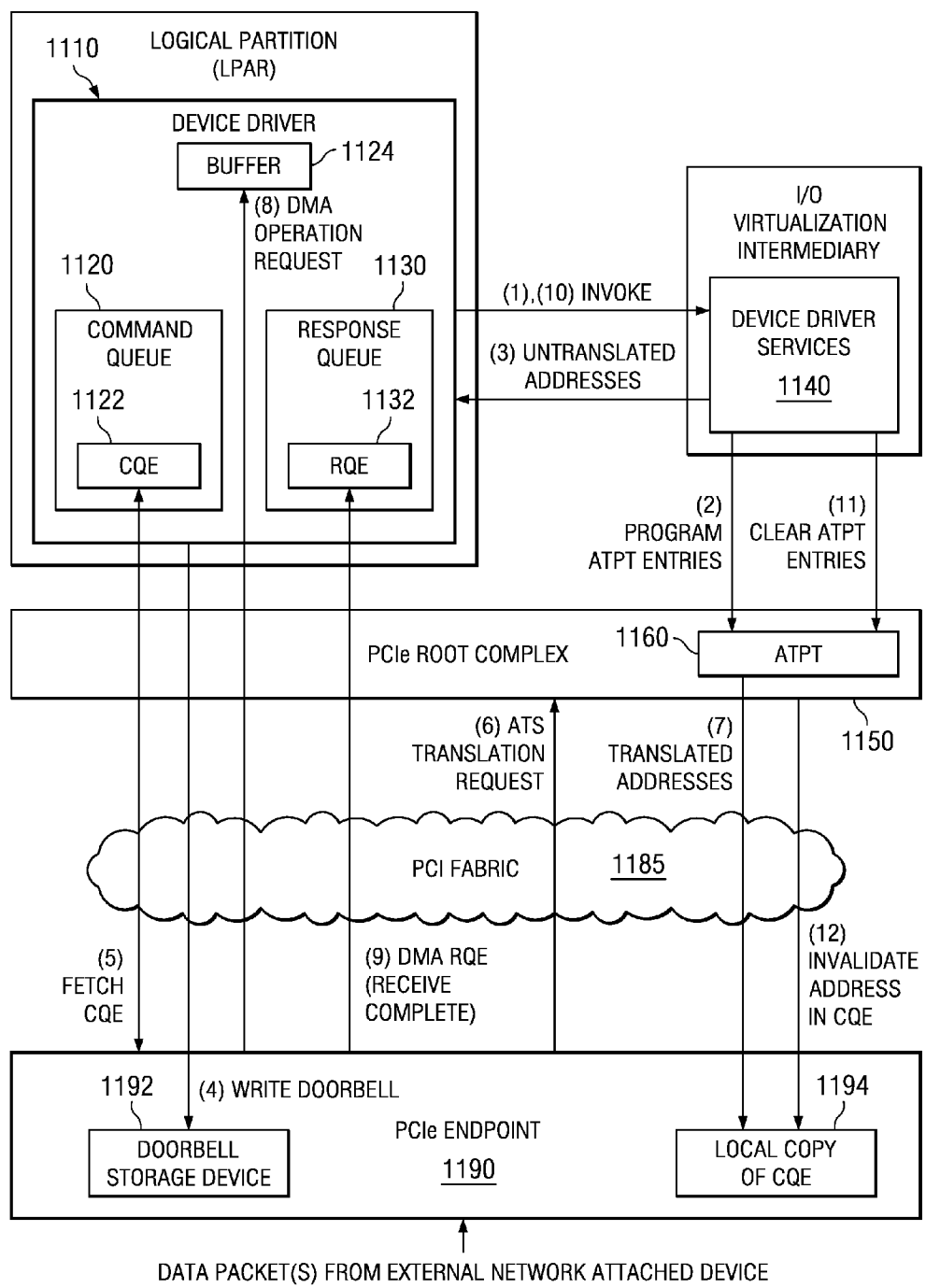
FIG. 11 is an exemplary diagram illustrating an operation for receiving data in a buffer of a host system from a PCIe endpoint using a queue entry, referred to as a "command queue entry" or CQE.

The processes for reception and transmission of data using the structures of the illustrative embodiments in association with a networking adapter will now be described with reference to FIGS. 11 and 12 hereafter. FIG. 11 is an exemplary diagram illustrating an operation for receiving data in a buffer of a host system from a PCIe endpoint using a queue entry, referred to as a "command queue entry" or CQE. Initially, the device driver 1110 invokes the device driver services 1140 to initialize one or more queue data structures, e.g., command queue data structure 1120, for sending requests to the PCIe endpoint 1190, which may be a networking adapter such as an Ethernet adapter, Fibre Channel adapter, InfiniBand™ adapter, or the like. As previously described, this initialization may comprise pinning the host system memory for the queue data structure, assigning DMA addresses, programming ATPT entries and setting a bit stating that the ATPT entries are cacheable, and returning the untranslated PCIe memory address to the device driver 1110.

After initializing the queue data structure, the device driver creates a CQE 1122 which contains a pointer, i.e. address, to a buffer 1124 that the PCIe endpoint is to use to store data from incoming data packets. The address for the buffer is an untranslated PCIe address.

The device driver 1110 then writes a doorbell value to a doorbell storage device 1192, e.g., a register, in the PCIe endpoint 1190. The doorbell value indicates to the PCIe endpoint 1190 that a CQE 1122 is available. The PCIe endpoint 1190, in response to the setting of the doorbell value in the doorbell storage device 1192, fetches the CQE 1122, and thus the buffer address, from the command queue data structure 1120.

Having fetched the untranslated PCIe address for the buffer 1124, the PCIe endpoint 1190 issues a request to the root complex 1150 for address translation of the untranslated PCIe address for the buffer 1124. The root complex 1150 uses the ATPT 1160 to translate the untranslated PCIe address into a translated system memory address and returns the translated system memory address to the PCIe endpoint 1190. The PCIe endpoint 1190 stores the translated system memory address in a local copy of the CQE 1194 in the PCIe endpoint 1190.

It should be appreciated that the translation and storing of the translated address, i.e. the system memory or real memory address, in a local copy of the CQE 1194 may be performed prior to receiving data packets from an external network attached device (not shown) for the CQE 1194. Thus, by the time that the data packet(s) are sent by the external network attached device and received in the PCIe endpoint 1190, the translated PCIe address may be stored in the local copy of the CQE 1194.

Once a result data packet is received in the PCIe endpoint 1190, the PCIe endpoint 1190 issues a DMA operation request to place the data in the buffer 1124 using the locally stored cached translated address, i.e. the system memory address corresponding to the untranslated PCIe address of the buffer 1124 stored in the local copy of the CQE 1194. The DMA operation request is performed with a bit set in the header of the DMA operation request to indicate that the address utilized in the DMA operation request is a translated system memory address. As a result, the root complex 1150 passes the DMA operation request through without address translation using the ATPT 1160 such that the data is written directly into the buffer 1124.

Once all of the data that is to be written to the buffer 1124 has been DMA'd to the buffer 1124 in this manner, the PCIe endpoint 1190 may DMA a response queue entry (RQE) 1132 to a response queue data structure 1130 in a similar manner. Once the device driver 1110 receives and processes the RQE 1132, the device driver 1110 invokes the device driver services 1140 to unpin the host memory for the data buffer 1124. The device driver services 1140 releases the DMA address for the data buffer 1124 and clears the ATPT entries for the data buffer 1124. The root complex 1150 issues an ATC entry invalidation request to the PCIe endpoint 1190 for clearing the address information in the local copy of the CQE 1194. The PCIe endpoint 1190 returns an ATC entry invalidation completion response to the root complex 1150 which informs the device driver services 1140 of the completion. The device driver services 1140 then returns control to the device driver 1110 and the operation is complete until the need to create the next CQE. It is also possible to reuse a data buffer for multiple operations (e.g., multiple CQEs), in which case the device driver services 1140 would not be called (e.g., to invalidate the data buffer address and unpin the memory), until the data buffer is no longer needed for other operations.

Figure 12:
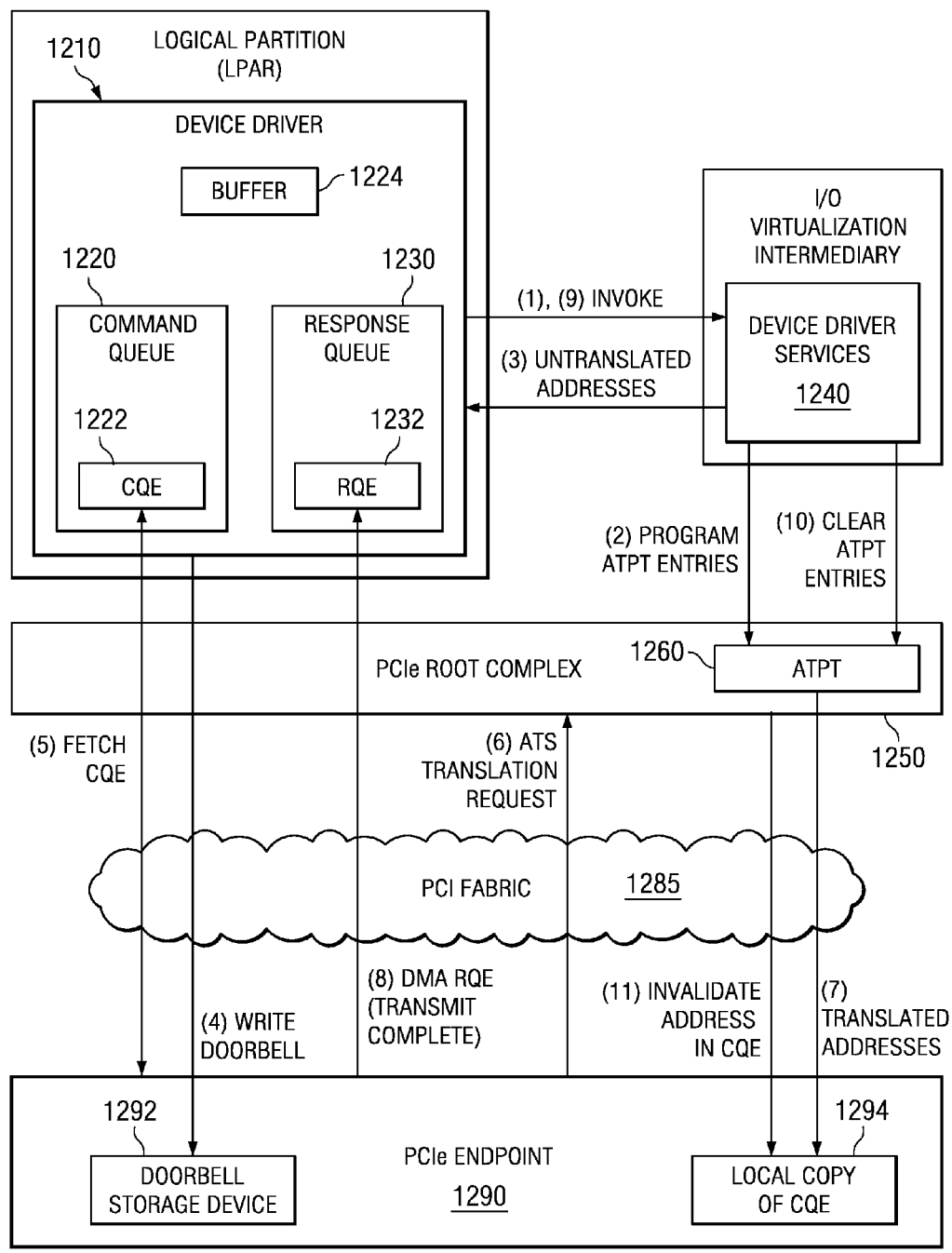
FIG. 12 is an exemplary diagram illustrating an operation for transmitting data via a PCIe endpoint using a CQE.

FIG. 12 is an exemplary diagram illustrating an operation for transmitting data via a PCIe endpoint using a CQE. When data is to be transmitted from the system image in the host system via the PCIe endpoint 1290, the device driver 1210 invokes the device driver services 1240 to pin host memory for buffer 1224, assigns DMA addresses for the buffer 1224, programs the ATPT entries in the ATPT 1260 for the buffer 1224 and sets a bit in the ATPT entries indicating that the address translation in these entries is cacheable. The device driver services 1240 return an untranslated PCIe address for the buffer 1224 to the device driver 1210.

The device driver creates a CQE 1222 which contains a pointer, i.e. address, to the buffer 1224 from which the PCIe endpoint 1290 is to transmit data via one or more of its ports. The address for the buffer 1224 is an untranslated PCIe address.

The device driver 1210 then writes a doorbell value to a doorbell storage device 1292, e.g., a register, in the PCIe endpoint 1290. The doorbell value indicates to the PCIe endpoint 1290 that a CQE 1222 is available. The PCIe endpoint 1290, in response to the setting of the doorbell value in the doorbell storage device 1292, fetches the CQE 1222, and thus the buffer address, from the command queue data structure 1220.

If the data buffers in the PCIe endpoint 1290 are full, e.g., downstream port is saturated, then the PCIe endpoint 1290 issues a ATS translation request to the root complex 1250. When the PCIe endpoint 1290 receives the translated address as a result of this ATS translation request, it stores the translated address in a local copy of the CQE 1294. After the PCIe endpoint 1290 DMA's the transmit data from the data buffer 1224 (e.g., when the port becomes available to transmit the data) and transmits the data, the PCIe endpoint 1290 then DMA's a RQE 1232 to the response queue 1230 to indicate that the transmit operation has completed and, if requested, may also generate an interrupt.

Once the device driver 1210 retrieves the RQE 1232, the device driver 1210 invokes the device driver services 1240 to unpin the host memory for the buffer 1224, releases the DMA addresses, and clears the ATPT entries for the untranslated addresses of the buffer 1224. The root complex 1250 then issues an ATC entry invalidation request to the PCIe endpoint 1290 and awaits a completion message from the PCIe endpoint 1290. Once the ATC entry invalidation operation is performed by the PCIe endpoint 1290, the device driver services 1240 return control to the device driver 1210. It is also possible to reuse a data buffer for multiple operations (e.g., multiple CQEs), in which case the device driver services 1140 would not be called (e.g., to invalidate the data buffer address and unpin the memory), until the data buffer is no longer needed for other operations.

FIGS. 13A-13B depict a flowchart outlining an exemplary operation for a receive operation of a network adapter in accordance with one illustrative embodiment. As shown in FIGS. 13A-13B, the operation starts with the device driver invoking the device driver services to initialize one or more data buffer structures (step 1310). More specifically, the device driver calls the device driver services to pin the host memory associated with the buffer(s) and to setup the ATPT for the buffer addresses. After initializing the data buffer structure(s), the device driver creates a queue entry which contains a pointer, i.e. untranslated PCIe memory address, to a buffer that the PCIe endpoint is to use to store data from incoming data packets (step 1315). The device driver then writes a doorbell value to a doorbell storage device in the PCIe endpoint (step 1320).

The PCIe endpoint, in response to the setting of the doorbell value in the doorbell storage device, fetches the queue entry, and thus the untranslated PCIe buffer memory address, from the queue data structure (step 1325). Having fetched the untranslated PCIe memory address for the buffer, the PCIe endpoint issues a request to the root complex for address translation of the untranslated PCIe address for the buffer (step 1330). The root complex uses the ATPT to translate the untranslated PCIe address into a translated system memory address and returns the translated system memory address to the PCIe endpoint (step 1335). The PCIe endpoint stores the translated system memory address in a local copy of the queue entry in the PCIe endpoint (step 1340).

The PCIe endpoint determines if a data packet is received (step 1345). If not, the operation waits for a data packet to be received by returning to step 1345. If a data packet is received in the PCIe endpoint, the PCIe endpoint issues a DMA operation request, with a translation bit in the header of the DMA operation request set, to place the data in the buffer of the host system using the locally stored cached system memory address (step 1350). The root complex passes the DMA operation request through without address translation using the ATPT such that the data is written directly into the buffer (step 1355). A determination is made as to whether all of the data that is to be written to the buffer has been DMA'd to the buffer (step 1360). If not, the operation returns to step 1345.

Once all of the data that is to be written to the buffer has been DMA'd to the buffer, the PCIe endpoint DMA's a response queue entry to a response queue data structure (step 1365). In response to receiving the RQE, the device driver invokes the device driver services to unpin the host memory for the data buffer structures (step 1370). The device driver services release the DMA address, i.e. the untranslated PCIe memory address, for the queue data structure (step 1375) and clears the ATPT entries for the queue data structure (step 1380). The root complex issues an ATC entry invalidation request to the PCIe endpoint for clearing the address information in the local copy of the queue entry (step 1385). The PCIe endpoint then invalidates the address information in the local copy of the queue entry and returns an ATC entry invalidation completion response to the root complex which informs the device driver services of the completion (step 1390). The device driver services then unpins the host memory associated with the data buffers (step 1392). The device driver services then returns control to the device driver (step 1395) and the operation terminates.

FIGS. 14A-14B depict a flowchart outlining an exemplary operation for a transmit operation of a network adapter in accordance with one illustrative embodiment. As shown in FIGS. 14A-14B, the operation starts with the device driver invoking the device driver services (step 1410) which in turn pins host memory for a buffer, assign DMA addresses for the buffer, programs the ATPT entries in the ATPT for the buffer, and sets a bit in the ATPT entries indicating that the address translation in these entries is cacheable (step 1415). The device driver services then return one or more untranslated PCIe memory address(es), i.e. DMA addresses, for the buffer to the device driver (step 1420).

The device driver creates a queue entry which contains a pointer, i.e. an untranslated PCIe memory address, to the buffer from which the PCIe endpoint is to transmit data via one or more of its ports (step 1425). The device driver then writes a doorbell value to a doorbell storage device in the PCIe endpoint (step 1430). The PCIe endpoint, in response to the setting of the doorbell value in the doorbell storage device, fetches the queue entry, and thus the untranslated PCIe memory address of the buffer, from the queue data structure (step 1435).

A determination is made as to whether data buffers in the PCIe endpoint are full (step 1440). If the data buffers are not full, the data is transferred via DMA and is placed in the data buffers of the PCIe endpoint for transmission (step 1460) and the PCIe endpoint transmits the data accordingly (step 1465).

If the data buffers are full, then the PCIe endpoint issues an ATS translation request to the root complex (step 1445). When the PCIe endpoint receives the translated address as a result of this ATS translation request (step 1450), the PCIe endpoint stores the translated address in a local copy of the queue entry (step 1455). The endpoint waits for available buffers (step 1457), the data is transferred via DMA and is placed in the data buffers of the PCIe endpoint for transmission (step 1460), and the PCIe endpoint then transmits the data accordingly (step 1465).

The PCIe endpoint then DMA's a response queue entry (RQE) to the response queue to indicate that the transmit operation has completed and, if requested, may also generate an interrupt (step 1470).

Once the device driver retrieves the RQE, the device driver invokes the device driver services to unpin the host memory for the buffer, release the DMA addresses, and clear the ATPT entries for the untranslated addresses of the buffer (step 1475). The root complex then issues an ATC entry invalidation request to the PCIe endpoint (step 1480) and awaits a completion message from the PCIe endpoint (step 1485). Once the ATC entry invalidation operation is performed by the PCIe endpoint, the device driver services unpins the host memory associated with the data buffer (step 1490) and then return control to the device driver (step 1495) and the operation terminates.

Thus, the illustrative embodiments provide a mechanism by which command queues and command queue entries may be generated for the reception and/or transmission of data via a network adapter PCIe endpoint into a buffer of the device driver in the host system. ATPT entries for the buffer may be established with the translations for the addresses corresponding to the buffer being cacheable in the PCIe endpoint for use in directly accessing the buffer without having to perform address translation in the root complex.

In addition to use with networking adapters, the mechanisms of the illustrative embodiments may further be used with other types of PCIe endpoints for communicating with locally available devices. For example, the PCIe endpoint may be a small component system interface (SCSI) adapter for communicating with storage devices directly attached to the PCIe endpoint. The mechanisms of the illustrative embodiments may be utilized to reduce the DMA read latency of SCSI adapters by providing a mechanism for caching address information for SCSI reads/writes in the SCSI adapter.

FIG. 15 is an exemplary diagram illustrating a SCSI read operation in accordance with one illustrative embodiment. As shown in FIG. 15, when the device driver 1510 receives a storage transaction request, such as from a system image or application running in the system image, the device driver 1510 invokes device driver services 1540 to pin the host memory for a device driver buffer 1524, assigns DMA addresses to the device driver buffer 1524, programs ATPT entries and enables the bit stating that these ATPT entries are cacheable, and returns an untranslated PCIe address to the device driver 1510 for the buffer 1524.

The device driver 1510 creates a command queue entry (CQE) 1522 in the command queue data structure 1520. The CQE 1522 contains the SCSI command and pointers, i.e. untranslated addresses, to the buffers, e.g., buffer 1524, associated with the command. The device driver 1510 then writes a doorbell value into a doorbell storage device 1592 which indicates to the PCIe endpoint 1590 that there are incoming requests.

In response to the doorbell value being set in the doorbell storage device 1592, the PCIe endpoint, which again may be a SCSI adapter, fetches the CQE 1522 from the command queue data structure 1520, and determines what type of command is being requested. This determination may be made, for example, based on a value provided in a header of the CQE 1522. If the CQE 1522 contains a SCSI command that is a read command for reading from disk, the PCIe endpoint 1590 issues a disk read operation followed by an ATS address translation request which requests that the root complex 1550 on the host system perform address translation on pointers, i.e. untranslated addresses, in the CQE 1522. When the PCIe endpoint 1590 receives the results of the address translation, the results are stored in a local copy of the CQE 1594 in the PCIe endpoint 1590. Thus, address translation of the pointers in the CQE 1522 may be performed at substantially the same time as the read operation is being performed. No translation is needed as part of the read operation since the untranslated addresses are used to access the SCSI device coupled to the PCIe endpoint 1590.

Once the SCSI device returns the data to the PCIe endpoint 1590, the PCIe endpoint 1590 issues a DMA operation to return the data to the host system using the locally stored cached translated address in the CQE 1594, i.e. the system bus address for the buffer 1524. The DMA is performed with the header bit set indicating that the address being utilized in the DMA is a translated address. As a result, no translation is performed by the root complex 1550 using the ATPT 1560 and the DMA is passed through to the buffer 1524.

The PCIe endpoint 1590 also DMA's a response queue entry (RQE) 1532 to the response queue data structure 1530 to indicate that the read from disk operation has been completed. If requested, the PCIe endpoint 1590 may also generate an interrupt.

Once the device driver 1510 retrieves the RQE 1532 of the read from disk operation, the device driver 1510 invokes the device driver services 1540 to unpin the host memory for the data buffer 1524. The device driver services 1540 further release the DMA addresses for the data buffer 1524 and clears the ATPT entries for the data buffer 1524. The root complex 1550 issues an ATC entry invalidation request to the PCIe endpoint 1590 thereby causing the PCIe endpoint 1590 to invalidate ATC entries, i.e. local copy of CQE 1594, corresponding to the cleared ATPT entries. When the ATC invalidation operation is complete, the device driver services 1540 return control to the device driver 1510.

FIGS. 16A-16B illustrate a flowchart outlining an exemplary operation for reading data from a SCSI device in accordance with one illustrative embodiment. As shown in FIG. 16A, the operation starts with the device driver receiving a storage transaction request (step 1602). The device driver invokes device driver services to pin the host memory for a device driver buffer (step 1604), assigns DMA addresses to the device driver buffer (step 1606), programs ATPT entries and enables the bit stating that these ATPT entries are cacheable (step 1608), and returns an untranslated PCIe memory address, i.e. DMA address, to the device driver for the buffer (step 1610).

The device driver creates a command queue entry (CQE) in the command queue data structure (step 1612), the CQE containing the SCSI command and pointers to the buffers associated with the command. The device driver then writes a doorbell value into a doorbell storage device (step 1614). In response to the doorbell value being set in the doorbell storage device, the PCIe endpoint fetches the CQE from the command queue data structure (step 1616), and determines whether the command in the CQE is a read command (step 1620).

If the CQE contains a SCSI command that is a read command for reading from disk, the PCIe endpoint issues a disk read operation followed by an ATS address translation request which requests that the root complex 1550 on the host system perform address translation on pointers in the CQE (step 1622). When the PCIe endpoint receives the results of the address translation, the results are stored in a local copy of the CQE in the PCIe endpoint (step 1624).

Once the SCSI device returns the data to the PCIe endpoint, the PCIe endpoint issues a DMA operation to return the data to the host system using the locally stored cached translated address in the CQE (step 1626). The DMA is performed with the header bit set indicating that the address being utilized in the DMA is a translated address (step 1628). As a result, no translation is performed by the root complex using the ATPT and the DMA is passed through to the buffer.

The PCIe endpoint also DMA's a response queue entry (RQE) to the response queue data structure to indicate that the read from disk operation has been completed (step 1630). If requested, the PCIe endpoint may also generate an interrupt.

Once the device driver retrieves the RQE of the read from disk operation, the device driver invokes the device driver services to unpin memory, release DMA addresses, and clear ATPT entries for the data buffer (step 1632). The device driver services further release the DMA addresses for the command queue and clear the ATPT entries for the command queue (step 1634). The root complex issues an ATC entry invalidation request to the PCIe endpoint thereby causing the PCIe endpoint to invalidate ATC entries corresponding to the cleared ATPT entries (step 1636). When the ATC invalidation operation is complete, device driver services unpins host memory for the buffer (step 1638) and the device driver services return control to the device driver (step 1640).

Returning to step 1620, as shown in FIG. 16B, if the command is not a read command, i.e. the command is a SCSI write command, the endpoint issues a disk seek operation to SCSI device based on the information in the CQE followed by an address translation request that is sent to the root complex for pointers in CQE (step 1650). The time taken to receive the translation request will generally be less than the time it takes the physical SCSI device to do the seek operation, thus hiding the address translation time from the latency of the overall operation.

When the endpoint receives the translated address(es) from the root complex, the endpoint stores these translated address(es) in a local copy of the CQE (step 1652). The endpoint then sets a DMA header to indicate that translated addresses are being utilized in the DMA request and performs the DMA operation to get data to be written from the data buffer in system memory using the locally cached translated address(es) in the local copy of the CQE (step 1654). The endpoint then waits for the SCSI device to indicate that the previous disk seek operation is complete (step 1656). In response to a message from the SCSI device indicating that the disk seek operation is complete, the endpoint transfers the previously DMA'd data to the SCSI device (step 1658). The operation then returns to step 1630 described above.

Thus, the illustrative embodiments provide mechanisms for communication with different types of PCIe endpoints, including network adapters, SCSI adapters, InfiniBand™ adapters, and the like, in such a manner as to distribute the responsibilities of this communication across a device driver and device driver services. The illustrative embodiments facilitate the use of caching of translated addresses in these various types of PCIe endpoints in different ways depending upon the type of PCIe endpoint utilized. The caching of these translated addresses permits the PCIe endpoint to directly access queues, buffers, and system memory of the host system without having to go through an address translation operation in the root complex of the host system.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for establishing address translations for communicating between a device driver and an input/output (I/O) device, comprising:

creating, by the device driver, a queue data structure used to contain queue elements associated with communication between the device driver and the I/O device;

initializing one or more address translation entries in an address translation data structure associated with a root complex of the data processing system for the queue data structure, in response to the device driver invoking device driver services, wherein the one or more address translation entries specify one or more translations from one or more untranslated addresses to one or more translated memory addresses associated with the queue data structure;

providing translation information, from the address translation data structure, for the one or more address translations associated with the queue data structure to the I/O device; and caching the address translation information in the I/O device for processing communications associated with the queue data structure, wherein the one or more untranslated addresses comprise at least an untranslated starting address for the queue data structure and optionally comprise one of an untranslated ending address for the queue data structure or a length of the queue data structure.

2. The method of claim 1, wherein providing the address translation information associated with the queue data structure to the I/O device, comprises:

passing, by the device driver services, the one or more untranslated addresses to the device driver;

providing, by the device driver, the one or more untranslated addresses of the queue data structure to the I/O device;

sending, by the I/O device, an address translation request to the root complex in response to receiving the one or more untranslated addresses; and receiving, from the root complex, the one or more translated addresses associated with the one or more untranslated addresses based on the one or more address translation entries in the root complex associated with the queue data structure.

3. The method of claim 2, wherein providing the one or more untranslated addresses of the queue data structure to the I/O device comprises:

writing, by one of the device driver or the device driver services, the one or more untranslated addresses into one of an I/O device configuration space or an I/O memory mapped input/output (MMIO) memory space.

4. The method of claim 1, wherein the I/O device requests the address translation information associated with one or more untranslated addresses of the queue data structures used to communicate between the device driver and the I/O device.

5. The method of claim 1, wherein the I/O device:

stores the one or more translated addresses of the queue data structures used to communicate between the device driver and the I/O device; and uses one or more previously stored translated addresses when performing a DMA transaction to access one or more entries of the queue data structures used to communicate between the device driver and the I/O device.

6. The method of claim 1, further comprising:

receiving, in the I/O device, an invalidation request that targets the translation information for the one or more address translations associated with the queue data structure; and invalidating the translation information for the one or more address translations in the cache of the I/O device in response to receiving the invalidation request.

7. The method of claim 1, wherein the queue data structures store queue entries specifying control information to be communicated between the device driver and one of a storage device or network device.

8. The method of claim 7, wherein the storage device or network device is a Peripheral Component Interconnect Extended (PCIe) adapter.

9. The method of claim 1, wherein the queue data structure is configured as one of a linked list queue data structure or a circular buffer queue data structure.

10. The method of claim 1, wherein the device driver is provided in a system image or untrusted logical partition of the data processing system and the device driver services are provided in a trusted virtualization intermediary.

11. A computer program product comprising a computer useable medium having a computer readable program, wherein the computer readable program, when executed on a computing device, causes the computing device to:

create, by the device driver, a queue data structure used to contain queue elements associated with communication between the device driver and the I/O device;

initialize one or more address translation entries in an address translation data structure associated with a root complex of the data processing system for the queue data structure, in response to the device driver invoking device driver services, wherein the one or more address translation entries specify one or more translations from one or more untranslated addresses to one or more translated memory addresses associated with the queue data structure;

provide translation information, from the address translation data structure, for the one or more address translations associated with the queue data structure to the I/O device; and cache the address translation information in the I/O device for processing communications associated with the queue data structure, wherein the one or more untranslated addresses comprise at least an untranslated starting address for the queue data structure and optionally comprise one of an untranslated ending address for the queue data structure or a length of the queue data structure.

12. The computer program product of claim 11, wherein the computer readable program causes the computing device to provide the address translation information associated with the queue data structure to the I/O device, by:

passing, by the device driver services, the one or more untranslated addresses to the device driver;

providing, by the device driver, the one or more untranslated addresses of the queue data structure to the I/O device;

sending, by the I/O device, an address translation request to the root complex in response to receiving the one or more untranslated addresses; and receiving, from the root complex, the one or more translated addresses associated with the one or more untranslated addresses based on the one or more address translation entries in the root complex associated with the queue data structure.

13. The computer program product of claim 12, wherein the computer readable program causes the computing device to provide the one or more untranslated addresses of the queue data structure to the I/O device by:

writing, by one of the device driver or the device driver services, the one or more untranslated addresses into one of an I/O device configuration space or an I/O memory mapped input/output (MMIO) memory space.

14. The computer program product of claim 11, wherein the I/O device requests the address translation information associated with one or more untranslated addresses of the queue data structures used to communicate between the device driver and the I/O device.

15. The computer program product of claim 11, wherein the I/O device:

stores the one or more translated addresses of the queue data structures used to communicate between the device driver and the I/O device; and uses one or more previously stored translated addresses when performing a DMA transaction to access one or more entries of the queue data structures used to communicate between the device driver and the I/O device.

16. The computer program product of claim 11, wherein the computer readable program further causes the computing device to:

receive, in the I/O device, an invalidation request that targets the translation information for the one or more address translations associated with the queue data structure; and invalidate the translation information for the one or more address translations in the cache of the I/O device in response to receiving the invalidation request.

17. The computer program product of claim 11, wherein the queue data structures store queue entries specifying control information to be communicated between the device driver and one of a storage device or network device.

18. The computer program product of claim 11, wherein the device driver is provided in a system image or untrusted logical partition of the data processing system and the device driver services are provided in a trusted virtualization intermediary.

19. An apparatus, comprising:
a processor; and
an input/output endpoint coupled to the processor, wherein the processor executes instructions which cause the processor to:
create, by the device driver, a queue data structure used to contain queue elements associated with communication between the device driver and the I/O device;

initialize one or more address translation entries in an address translation data structure associated with a root complex of the data processing system for the queue data structure, in response to the device driver invoking device driver services, wherein the one or more address translation entries specify one or more translations from one or more untranslated addresses to one or more translated memory addresses associated with the queue data structure;

provide translation information, from the address translation data structure, for the one or more address translations associated with the queue data structure to the I/O device; and cache the address translation information in the I/O device for processing communications associated with the queue data structure, wherein the one or more untranslated addresses comprise at least an untranslated starting address for the qlueue data structure and optionally comprise one of an untranslated ending address for the queue data structure or a length of the queue data structure.

* * * * *